United States Patent
Matsumoto et al.

[11] Patent Number: 5,215,795
[45] Date of Patent: Jun. 1, 1993

[54] SHOCK-ABSORBING AIR BAG

[75] Inventors: Mitsuo Matsumoto, Ibaraki; Nobuo Takahashi, Ikoma; Hideo Nakagawa, Takatsuki; Masayuki Takahashi, Takarazuka; Kunio Nishimura, Ibaraki, all of Japan

[73] Assignee: Teijin Limited, Osaka, Japan

[21] Appl. No.: 715,914

[22] Filed: Jun. 14, 1991

[30] Foreign Application Priority Data

| Oct. 2, 1990 | [JP] | Japan | 2-262979 |
| Oct. 5, 1990 | [JP] | Japan | 2-266342 |
| Oct. 25, 1990 | [JP] | Japan | 2-285803 |
| Feb. 19, 1991 | [JP] | Japan | 2-45328 |

[51] Int. Cl.5 .............................. B60R 21/16
[52] U.S. Cl. .............................. 428/36.1; 428/36.3; 428/228; 428/299; 428/373; 428/375; 428/902; 428/225; 428/229; 428/253; 428/254; 428/288; 428/291; 428/303; 57/2; 57/252; 57/224; 57/255; 280/728; 280/743
[58] Field of Search .............. 428/373, 375, 378, 902, 428/34.9, 36.1, 224, 225, 229, 245, 253, 254, 257, 288-291, 303, 36.3, 228, 299, 365, 377, 394, 395; 280/708-743; 57/2, 252, 224, 255

[56] References Cited

U.S. PATENT DOCUMENTS

| 4,004,406 | 1/1977 | Suzuki et al. | 57/2 |
| 4,860,530 | 8/1989 | Montgomery et al. | 57/224 |
| 4,921,735 | 5/1990 | Bloch | 428/34.9 |
| 5,103,626 | 4/1992 | Morrison | 57/224 |

OTHER PUBLICATIONS

Patent Abstracts of Japan vol. 13, No. 267, Jun. 20, 1989.
Patent Abstracts of Japan vol. 14, No. 237, May 21, 1990.

Primary Examiner—Ellis P. Robinson
Assistant Examiner—Charles R. Nold
Attorney, Agent, or Firm—Burgess, Ryan & Wayne

[57] ABSTRACT

An shock-absorbing air bag for an automobile or aircraft, has a high heat and flame resistance and satisfactory mechanical strength and comprises a high density woven fabric composed of warps and wefts each comprising (a) 0 to 90% by weight of thermoplastic synthetic fibers, for example, polyester fibers, having a denier or 5 or less and a Young's modulus of 1300 kg/mm$^2$ or less, and (b) 10 to 100% by weight of heat resistant organic fibers, for example, aramid fibers, having a denier of 2 or less and a thermal decomposition temperature of 300° C. or more, the woven fabric preferably having a high cover factor of 1900 or more.

20 Claims, 7 Drawing Sheets

SHOCK-ABSORBING AIR BAG

BACKGROUND OF THE INVENTION

1) Field of the Invention

The present invention relates to a shock-absorbing air bag. More particularly, the present invention relates to a shock-absorbing air bag comprising a woven fabric having a high flame resistance, a light weight and a preferable air-permeability and folding capability.

2) Description of the Related Art

It is known that a conventional shock-absorbing air bag is produced by a sewing procedure from at least one woven fabric having a plain weave or twill weave structure, composed of warps and wefts each comprising a high strength nylon 6, nylon 66 or polyester multifilament yarn having a total denier of 400 to 1000, and coated with an elastomer resin, for example, a chloroprene rubber or silicone rubber. This type of air bag is disclosed in, for example, Japanese Examined Patent Publication No. 48-30293 and Japanese Unexamined Utility Model Publication Nos. 48-81543 and 51-117936.

The woven fabrics for the conventional air bags exhibit a high heat resistance and flame resistance, and the air bag is arranged between a steering wheel and a front seat for a driver or pilot of an automobile or aircraft, and is quickly inflated by a blast of a combustion gas generated in and blown from an inflater when the automobile or aircraft is in an accident. Accordingly, the air bag must exhibit a satisfactory resistance to a high temperature and the pressure of the combustion gas blast; namely, the air bag must satisfy a safety standard set for the air bag, and accordingly, the woven fabric for the conventional air bag is coated with an elastomer resin layer in a large basis weight.

This heavy and thick coating layer causes the woven fabric for the air bag to become stiff and makes it difficult to sew and handle, and further, the resultant air bag has a undesirably large volume when folded.

The air bag must be arranged in front of the driver or pilot to protect him or her from damage, but the space in front of the driver or pilot is equipped with a steering wheel, various instruments and a window, and thus the space in which the air bag can be accommodated is very restricted, and accordingly, the air bag must be able to be compactly folded and received in such a restricted space. Also, when installed at a steering wheel, the air bag must be as light as possible.

Further, when the combustion gas blast is blown into the air bag, a portion of the combustion gas blast is blown under a high pressure from the air bag through a pair of vent holes each having a diameter of about 30 mm and formed in the air bag, and this blown portion of the combustion gas blast sometimes impinges on a person or persons in the automobile or aircraft.

Accordingly, a new type of air bag not having a vent hole is required.

SUMMARY OF THE INVENTION

An object of the present invention is to provide a shock-absorbing air bag formed from a woven fabric which is not coated with an elastomer resin, for example, a chloroprene rubber or silicone rubber, and has a high resistance to flame and to a high pressure, high temperature blast of air or gas.

Another object of the present invention is to provide a shock-absorbing air bag having a light weight and capable of being compactly folded and contained in a small space.

The above-mentioned objects can be attained by the shock-absorbing air bag of the present invention composed of at least one high density woven fabric (A) composed of warps and wefts each comprising:

(a) 0 to 90% by weight of thermoplastic synthetic fibers having a denier of 5 or less and a Young's modulus of 1300 kg/mm$^2$ or less; and (b) 10 to 100% by weight of heat-resistant organic fibers having a denier of 2 or less and a thermal decomposition temperature of 300° C. or more, and evenly blended with the thermoplastic synthetic fibers (a).

Preferably, the blending weight ratio of the thermoplastic synthetic fibers (a) to the heat resistant organic fibers (b) is in the range of 90:10 to 30:70.

DESCRIPTION OF THE PREFERRED EMBODIMENTS

The air bag of the present invention is used to protect a person or persons sitting on a front seat of an automobile or aircraft, when an accident occurs by inflating the air bag into the form of a sphere.

Figure 1A:
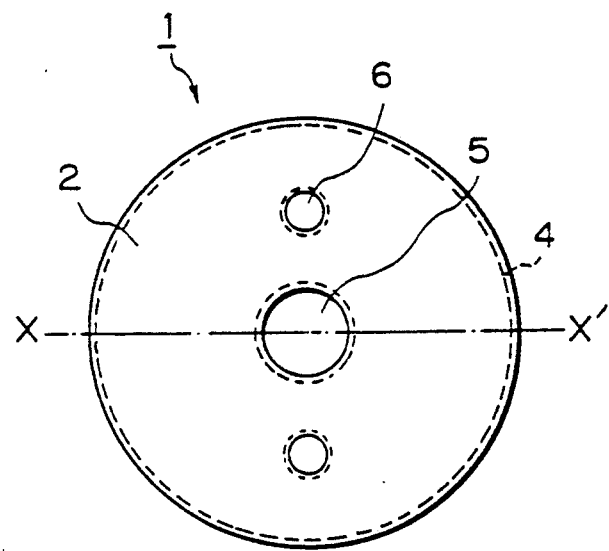
FIG. 1A is a plan view of an embodiment of the shock-absorbing air bag of the present invention.
Figure 1B:
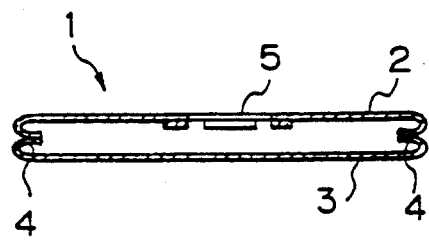
FIG. 1B is a cross-sectional profile of the air bag shown along a line X—X' in FIG. 1A.

Referring to FIGS. 1A and 1B, an air bag 1 comprises a front circular portion 2 and a back circular portion 3 thereof, which are firmly sewn together at outside edge portions 4 thereof. The front circular portion 2 of the air bag 1 is provided with a center hole 5 located in a center portion thereof, through which center hole 5, the air bag is connected to an inflater (not shown in FIGS. 1A and 1B) and a combustion gas blast generated in the inflater is flown into the air bag, and at least one, usually two or more, vent holes 6 for discharging a portion of the combustion gas introduced from the inflater into the air bag. The air bag is received in a folded form within a space in front of a front seat of an automobile or aircraft.

Figures 2A, 2B, 2C:
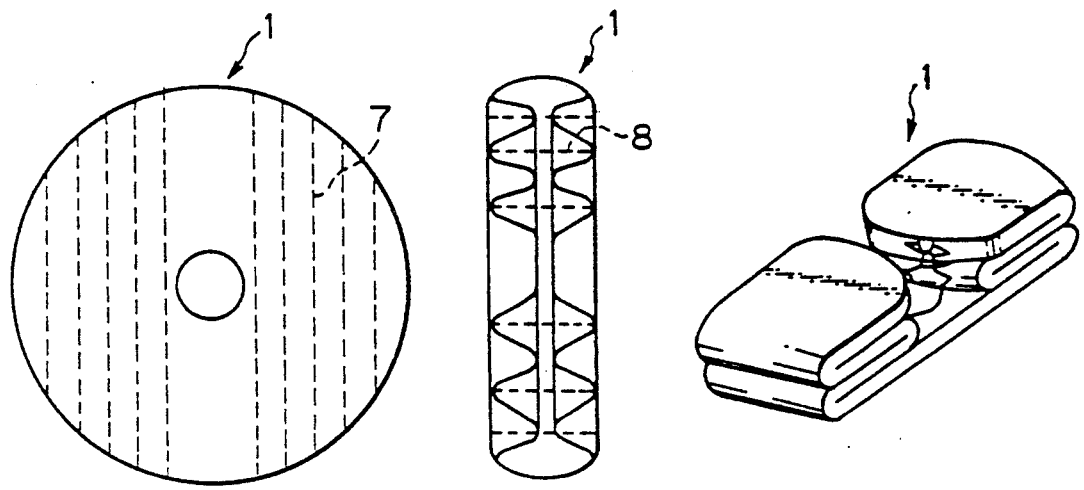
FIG. 2A is a plan view of an embodiment of the shock-absorbing air bag of the present invention, showing a plurality of dotted lines along which the air bag is folded.
FIG. 2B is a back view of the air bag of FIG. 2A, showing a plurality of dotted lines along which the air bag is further folded.
FIG. 2C is a perspective side view of the air bag of FIGS. 2A and 2B folded first along the dotted lines in FIG. 2A and then along the dotted lines in FIG. 2B.

Referring to FIGS. 2A, 2B and 2C, an air bag 1 is folded along the dotted lines 7 indicated in FIG. 2A and then along the dotted lines 8 indicated in FIG. 2B; the folded air bag is then in the form as shown in FIG. 2C.

Figure 3:
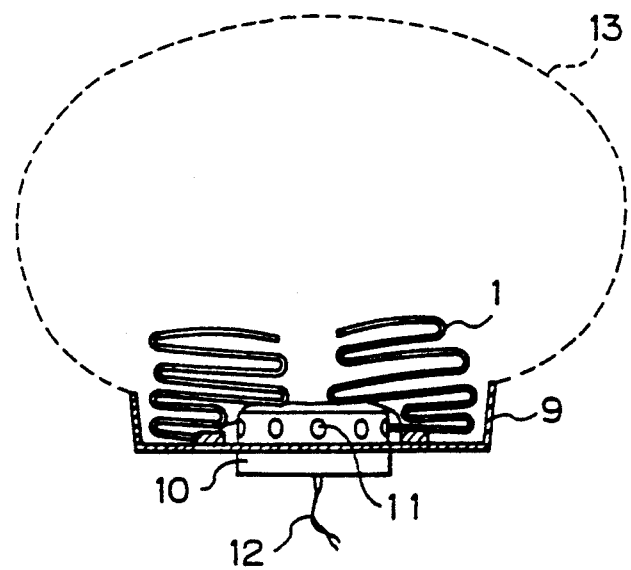
FIG. 3 is a front view of a folded air bag of the present invention connected to an inflater.

Referring to FIG. 3, the folded air bag 1 is received in a container 9, and the center hole of the air bag 1 is connected to an inflater 10 having a plurality of combustion gas-ejecting holes 11 opening inside of the center hole of the air bag 1.

When an automobile or aircraft is in a collision, an electric current flows through wires 12 connected to a power source (not shown) to generate a combustion gas in the inflater 10, and a combustion gas blast is rapidly blown into the air bag 1 to inflate the air bag 1 into the spherical form as shown by dotted lines 13.

Accordingly, the shock-absorbing air bag must be able to resist the high temperature, high pressure blast of the combustion gas.

The shock-absorbing air bag of the present invention comprises at least one high density woven fabric (A) composed of a number of warps and wefts each comprising 0 to 90% by weight of thermoplastic synthetic fibers (a) and 10 to 100% by weight of heat resistant organic fibers.

The term "fiber" as used herein includes a short or cut fiber and a continuous filament.

The thermoplastic synthetic fibers (a) has a denier of 5 or less, preferably 0.3 to 2.5, and a Young's modulus of 1300 kg/mm$^2$ or less, preferably 400 to 1200 kg/mm$^2$.

The thermoplastic organic fibers (a) are preferably selected from polyester fibers, for example, polyethylene terephthalate fibers and polybutylene terephthalate; polyamide fibers, for example, nylon 6 and nylon 66 fibers; and polyacrylic fibers, for example, polyacrylonitrile fibers, polyethylene fibers and polypropylene fibers.

The heat resistant organic fibers (b) have a denier of 2 or less, preferably 0.2 to 1.5 and a thermal decomposing temperature (T.D.T.) of 300° C. or more, preferably 350° C. or more.

The heat resistant organic fibers (b) are preferably selected from wholly aromatic polyamide (aramid) fibers, aramid-copolymer fibers, poly-p-phenylenesulfon fibers, poly-p-phenylene sulfide fibers, wholly aromatic polyester fibers, polyimide fibers, polyetherimide fibers and polyetheretherketone fibers.

The wholly aromatic polyamide fibers usable as the heat resistant organic fibers (b) of the present invention are preferably selected from poly-m-phenyleneisophthalamide fibers, poly-p-phenyleneterephthalamide fibers, para-type aramid-meta type aramid copolymer fibers and poly-p-phenyleneoxy-diphenyleneterephthalamide fibers which are 3,4-diaminodiphenylether-para type amid copolymer fibers.

In the woven fabric for forming the air bag of the present invention, due to the blend of the individual thermoplastic synthetic fibers (a) with the individual heat resistant organic fibers in the above-mentioned blending weight ratio, the resultant woven fabric (A), which is not coated with an elastomer resin, exhibits a high resistance to heat, flame and pressure, and therefore, the resultant air bag is not melt-broken or burnt even when a combustion gas blast having a high temperature is blown therein under a high pressure.

If the denier of the thermoplastic synthetic fibers (a) in the warps and wefts of the woven fabric (A) is more than 5, the resultant air bag exhibits an undesirably high stiffness similar to that of conventional air bag coated with an elastomer resin layer, and thus it becomes difficult to compactly fold same.

Also, an increase in a denier of the thermoplastic synthetic fibers (a) results in a reduction in the number of the fibers (a) in the resultant warps and wefts, and thus it becomes difficult to evenly blend the thermoplastic synthetic fibers (a) with the heat resistant organic fibers (b).

Also, the use of the large denier of fibers causes the resultant woven fabric and air bag to exhibit an undesirably high gas-permeability.

If the Young's modulus of the thermoplastic synthetic fibers (a) is more than 1300 kg/mm$^2$, the resultant yarns (warp and wefts) exhibit an undesirably high Young's modulus, and thus the resultant woven fabric and air bag exhibit an undesirably high stiffness.

In general, the heat resistant organic fibers (b) have a Young's modulus higher than that of the thermoplastic synthetic fibers (a), but the resultant woven fabric (A) or air bag must be soft and able to be compactly folded, and therefore, the heat resistant organic fibers (b) must have a small denier of 2 or less. If the denier is more than 2, the resultant woven fabric is too stiff, and thus it becomes difficult to compactly fold the resultant air bag.

Also, the heat resistant organic fiber (b) has a high thermal decomposition temperature of 300° C. or more. If the thermal decomposition temperature is less than 300° C., the resultant woven fabric (A) exhibits an unsatisfactory heat resistance and flame resistance, and therefore, the resultant air bag is melt-broken or burnt when the combustion gas blast is flown therein.

The thermoplastic synthetic fibers (a) are evenly blended with the heat resistant organic fibers (b), preferably in a blending weight ratio (a)/(b) of 90:10 to 30:70, more preferably from 80:20 to 40:60.

When the blending weight ratio (a)/(b) is more than 90:10, the resultant woven fabric and air bag sometimes exhibit an unsatisfactory flame-resistance, heat resistance, and mechanical strength. Accordingly, to increase the mechanical strength of the woven fabric (A) or air bag, the warp and wefts of the woven fabric must have an increased thickness, but this increased thickness of the warps and wefts causes the resultant woven fabric to have an undesirably large thickness, and thus it become difficult to compactly fold the resultant air bag.

If the blending weight ratio (a)/(b) is less than 30:70, the resultant woven fabric sometimes exhibits an undesirably high stiffness and inferior touch, because the heat resistant fibers (b) comprising a majority of the warps and wefts exhibit a high modulus. Also, the resultant warps and wefts exhibit a poor thermal shrinking property because the content of the thermoplastic synthetic fibers (a) having a relatively high thermal shrinkage is unsatisfactorily low, and therefore, the resultant woven fabric (A) exhibits an unsatisfactorily high gas permeability.

Further, since the heat resistant fibers (b) are expensive compared with the thermoplastic synthetic fibers (a), the increase in the content of the heat resistant fibers (b) in the woven fabric results in an undesirably increased cost of the air bag.

Preferably, the heat-resistant fibers (b) have a tensile strength of 16 g/d or more, more preferably, 18 g/d or more.

If the heat-resistant fibers (b) have a tensile strength of less than 16 g/d and are used in an amount of 10% by weight or more, the resultant woven fabric (A) sometimes exhibits an unsatisfactory mechanical strength.

The blended fiber yarns for the woven fabric (A) can be produced by arranging at least one thermoplastic synthetic multifilament yarn and at least one heat resistant multifilament yarn in parallel with each other, randomly stretch-breaking the resultant paralleled filaments while preventing a disturbance of the filaments, and fasciating the resultant stretch broken fibers with each other by blowing air jet streams thereon, to thus form a fasciated fiber yarn.

Figure 4:
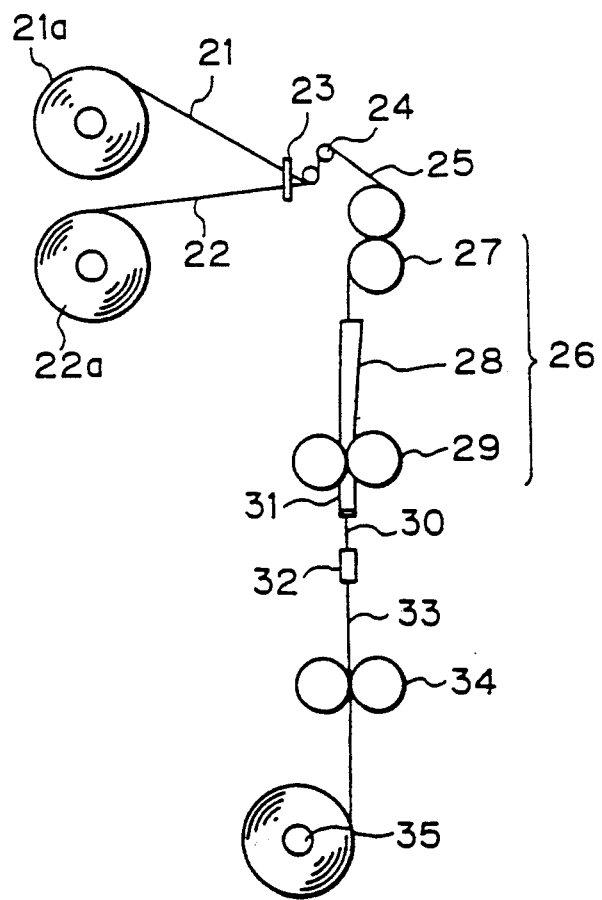
FIG. 4 is a side view of an apparatus for producing a blended stretch-broken, fasciated fiber yarn from two different multifilament yarns.

The above-mentioned blended, stretch-broken, fasciated fiber yarn can be produced by using the apparatus as shown in FIG. 4.

Referring to FIG. 4, a thermoplastic synthetic multifilament yarn 21 is taken out from a yarn cheese 21a, a heat resistant multifilament yarn 22 is taken out from a yarn cheese 22a, and the multifilament yarns 21 and 22 are arranged in parallel with each other through a guide 23 and a pair of guide rollers 24. The parallel filaments 25 are introduced into a stretch-breaking zone 26 consisting of a pair of feed rollers 27, a shooter 28 and a pair of stretch-breaking rollers which rotate at a higher peripheral speed than that of the feed roller 27. In the stretch-breaking zone 26, the parallel filaments 25 are blended with each other, drafted, and stretch-broken between the feed rollers 27 and the stretch-breaking rollers 29, while preventing a disturbance of the filaments by using the shooter 28. The resultant stretch-broken fibers 30 are collected through the stretch-breaking rollers 29, by using an air-sucking nozzle 31, and then introduced into a fasciating nozzle 32 in which an air stream is revolved, and the stretch-broken fibers are entangled with each other by the revolving air stream to form a fasciated fiber yarn 33.

The resultant stretch-broken, fasciated fiber yarn 33 is taken up from the fasciating nozzle 32 by a pair of delivery rollers 34 and wound up on a bobbin 35.

The stretch-broken, fasciated fiber yarn has a number of short fibers randomly twined around a fiber bundle core, and thus have a higher frictional resistance to each other than that of a conventional multifilament yarn. Therefore, when a woven fabric is formed from a number of warp and wefts each consisting of the stretch-broken, fasciated fiber yarns, the warp and wefts exhibit a high resistance to slippage, and seams formed in the woven fabric exhibit a high stability against slippage.

Also, the short fibers extending outward from the yarn effectively reduce the gaps between the yarns in the woven fabric, and thus lower the gas permeability of the woven fabric.

Further, the stretch-broken, fasciated fiber yarn is advantageous in that an orientation of fibers in the yarn is very high compared with that of a conventional spun yarn, and the yarn exhibits a high mechanical strength because the fibers are ultimately oriented and have a relatively large average length. Therefore, the stretch-broken, fasciated fiber yarn is most appropriate for use as warps and wefts for the air bag-forming woven fabric.

Figure 5:
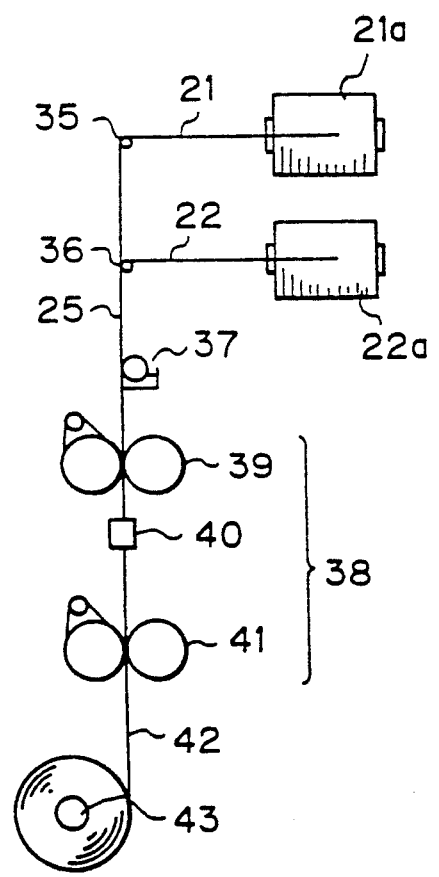
FIG. 5 is a side view of an apparatus for producing a blended multifilament yarn from two different multifilament yarns.

The blended fiber yarns for the woven fabric (A) can be produced by the apparatus shown in FIG. 5.

Referring to FIG. 5, a thermoplastic synthetic multifilament yarn 21 and a heat resistant multifilament yarn 22 are respectively taken out from yarn cheese 21a and 22a, through guides 35 and 36, and arranged in parallel to each other. The parallel filaments 25 are then brought into contact with a water-supply roller 37 and introduced into a filament blending zone 38 composed of a pair of feed rollers 39, a filament-blending air nozzle 40, and a pair of delivery rollers 41. In this filament blending zone 38, the individual filaments in the parallel filaments 25 introduced through the feed rollers 39 are evenly blended with each other by the blending air nozzle 40, and the resultant blended filament yarn 42 is delivered through the delivery rollers 41 and wound on a bobbin 43.

The thermoplastic synthetic multi-filament yarn and the heat resistant multifilament yarn can be separately converted to a stretch-broken, fasciated fiber yarn.

Figure 6:
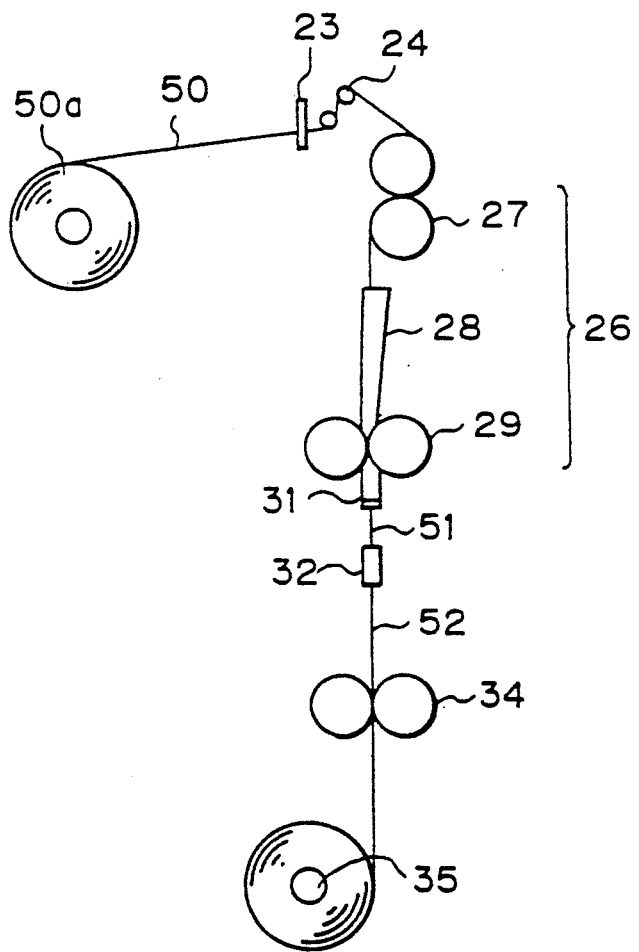
FIG. 6 is a side view of an apparatus for producing a stretch-broken, fasciated fiber yarn from one type of multifilament yarn.

In FIG. 6, a multifilament yarn 50 is drawn out from a yarn cheese 50a and introduced into a stretch-breaking zone 26 composed of a pair of feed rollers 27, a shooter 28 and a pair of stretch-breaking rollers 29, through guides 23 and 24.

The stretch-broken fibers 51 are collected by an air-sucking nozzle 31 and introduced into a fasciating nozzle 32, and the resultant stretch-broken, fasciated fiber yarn 52 is withdrawn from the fasciating nozzle 32 through a pair of delivery rollers 34 and wound on a bobbin 35.

Figure 7:
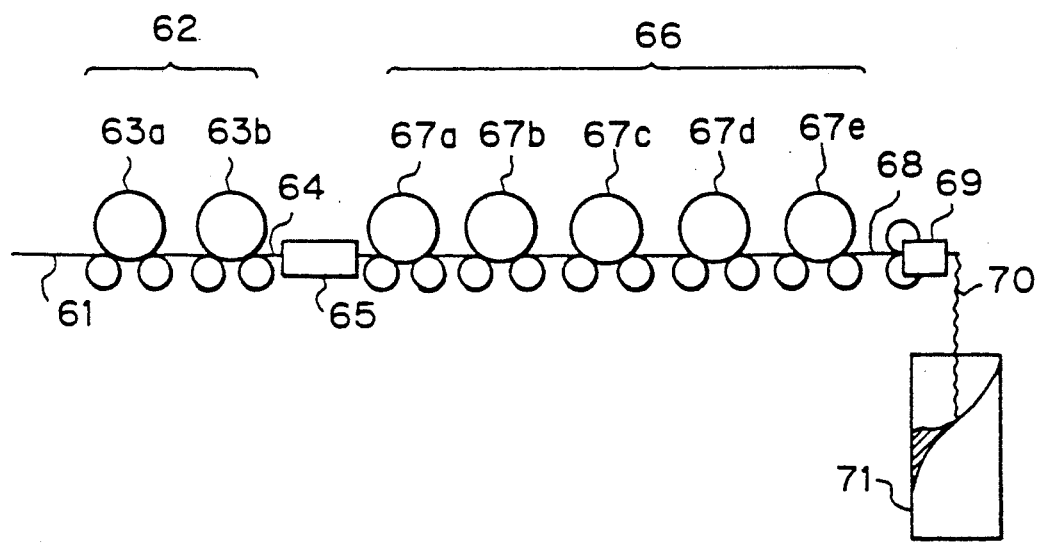
FIG. 7 is a side view of a tow spinning apparatus.

The blended fiber yarns for the woven fabric (A) can be produced by a tow-spinning apparatus as indicated in FIG. 7.

Referring to FIG. 7, a tow 61 composed of a stretch-broken, fasciated thermoplastic synthetic fiber sliver and a stretch-broken, fasciated heat resistant fiber sliver arranged in parallel to each other, is introduced into a roving zone 62 composed of roving nip rollers 63a and 63b. The resultant blended fiber roving 64 is heat set in a heater 65 and then introduced into a fine spinning zone 66 having a plurality of fine spinning nip rollers 67a, 67b, 67c, 67d, and 67e.

The resultant blended fiber spun yarn 68 is crimped by a crimper 69 and the crimped fiber yarn 70 is received in a can 71.

The woven fabric (A) for the air bag of the present invention is produced from the blended fiber yarns comprising the thermoplastic synthetic fibers (a) and the heat resistant organic fibers (b) or from fiber yarns consisting of only the heat resistant organic fibers.

The woven fabric (A) preferably has a cover factor of 1900 or more, more preferably from 1900 to 3900, more preferably from 2000 to 3500.

The term "cover factor" is defined by the following equation.

$$CF = \rho_w \times \sqrt{D_w} + \rho_f \times \sqrt{D_f}$$

wherein CF represents a cover factor of a woven fabric composed of a number of warps and wefts, $\rho_w$ represents a density of the warps in the number of warps/25.4 mm, $D_w$ represents a denier of the warps, $\rho_f$ represents a density of the wefts in the number of wefts/25.4 mm, and $D_f$ represents a denier of the wefts.

If the cover factor is less than 1900, the resultant woven fabric sometimes exhibits an unsatisfactorily low gas-intercepting property even after the fabric is heat-pressed, and thus the resultant air bag cannot satisfactorily intercept a spouting of the combustion gas blast or flame therethrough.

If the cover factor is more than 3900, the resultant woven fabric sometimes exhibits a high stiffness similar to that of the conventional elastomer-coated woven fabric, and thus it becomes difficult to compactly fold the resultant air bag.

The woven fabric (A) for the air bag of the present invention preferably has a fiber-packing ratio of from 0.50 to 0.87 more preferably from 0.55 to 0.82.

The term "fiber-packing ratio" of a fabric refers to a ratio of a bulk specific gravity of the fabric to a true specific gravity of the fabric.

If the fiber-packing ratio is less than 0.50, the resultant woven fabric sometimes has an unsatisfactory gas-intercepting property, and thus the resultant air bag cannot satisfactorily intercept a spouting of the combustion gas and flame through the air bag.

If the fiber-packing ratio is more than 0.87, the resultant woven fabric exhibits a very high stiffness, and thus it is difficult to compactly fold the resultant air bag.

The fiber-packing ratio of the woven fabric (A) can be adjusted to a desired level by heat-pressing the woven fabric by at least one pair of calender rollers, each composed of a metal roller and a elastic roller or a metal roller and a metal roller. In this heat-pressing procedure, the metal roller preferably has a peripheral surface temperature of 150° C. to 300° C. and the calendering pressure is 100 kg/cm or more. To obtain a smooth pressing at a high efficiency, the woven fabric is pre-heated at a temperature of 50° C. to 200° C. or the pressing rollers are rotated at a low peripheral speed.

When the cover factor is 1900 or more, and the fiber-packing ratio is 0.50 to 0.87, the resultant woven fabric (A) exhibits a satisfactory gas-intercepting property and softness, and therefore, the resultant air bag can be easily folded compactly and can intercept the stream or flame of the high temperature, high pressure combustion gas.

The woven fabric (A) usable for the air bag of the present invention preferably has a high flame resistance represented by a burn-perforating time of 5 seconds or more, more preferably 10 seconds or more, determined in such a manner that a flame at a temperature of about 780° C. is brought into contact with a lower surface of a specimen of the woven fabric (A) fixed to and held horizontally by a frame, and a time needed to burn-perforate the specimen by the flame is measured.

If the flame resistance is less than 5 seconds, the resultant air bag is easily melt-broken when a high temperature, high pressure combustion gas flame is blown from a inflater therein, and cannot satisfactorily intercept the flame.

As described above, the air bag is provided with a center hole through which an inflater is connected to the air bag, and optionally, at least one vent hole through which a portion of a combustion gas blown from the inflater into the air bag is discharged.

In an embodiment of the air bag of the present invention, at least a portion of the air bag surrounding at least the center hole, and optionally the vent hole, is reinforced by aprons attached to the portions.

Figure 8:
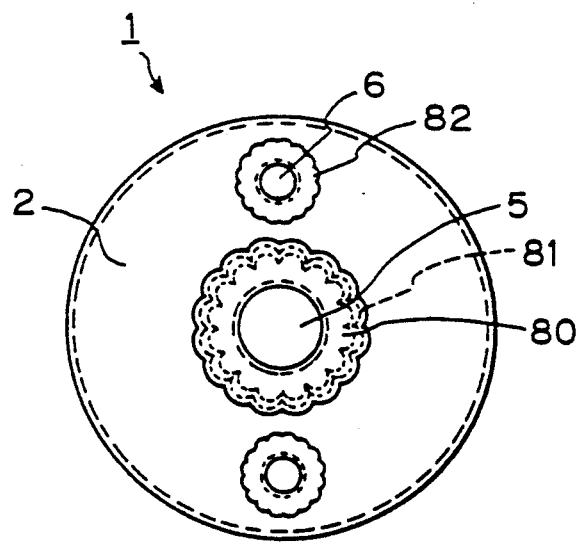
FIG. 8 is a plan view of another embodiment of the air bag of the present invention.

Referring to FIG. 8, an apron 80 is arranged around a center hole 5 through which an inflater (not shown) is connected to the air bag 1, and firmly sewn to the air bag 1 by seams 81. Also, if necessary, portions of the air bag 1 around the vent holes 6 are reinforced by aprons 82.

The apron for reinforcing the air bag is composed of a woven fabric (B) preferably comprising at least the heat resistant fibers (b) in a higher content thereof than that in the woven fabric (A) and having a cover factor of 1900 or more, more preferably 1900 to 3900 and a fiber-packing ratio of 0.5 or more, more preferably 0.5 to 0.87.

The apron is usually attached to an inside surface of the air bag, but the apron may be attached to an outside surface of the air bag.

Also, the content of the heat resistant organic fibers (b) in the woven fabric (B) is preferably at least 5% by weight, more preferably at least 10% by weight, higher than that in the woven fabric A. The apron may be formed by a piece of the woven fabric (B) or by a laminate consisting of two or more pieces, preferably 2 to 4 pieces, more preferably 2 or 3 pieces, of the woven fabric (B), and optionally, the woven fabric (A). The size of the apron must be as large as possible.

The woven fabrics (A) and (B) may be coated or impregnated with a soft resin. The soft resin preferably comprises at least one member selected from polyurethane resins, silicone rubbers, chloroprene rubbers, chlorosulfonated olefin resins, fluorine-containing rubbers, polyvinyl chloride resins, chlorinated olefin resins, and fluorine-containing resins, and derivatives of the above-mentioned resins and rubbers. The soft resin may be blended with a flame retardant containing at least one member selected from organic and inorganic flame-retarding compounds, for examples, halogen-containing compounds, phosphorus-containing compounds and metal hydroxides. Also, the soft resin may consist of a blend of two or more soft polymers. Among the above-mentioned soft resins and rubbers, the silicone resins and modified silicone resins have an excellent adhesion to the high strength heat-resistant fibers, and thus are preferably utilized for the present invention.

The soft resin can be applied to the woven fabrics (A) and (B) by a customary method, for example, coating or laminating. The soft resin is applied in a relatively small amount, for example, 0.5 to 8% by weight preferably 1 to 6% by weight, to the woven fabrics (A) and (B). When the amount of the soft resin is less than 0.5% by weight, the resultant soft resin layer on the fabric sometimes exhibits an unsatisfactory covering effect, and thus cannot effectively shield the fabric from a flame or high temperature blast. If the soft resin is used in an amount of less than 8% by weight, the resultant coated or impregnated woven fabric sometimes exhibits an unsatisfactory softness and becomes heavy.

The soft resin-applied woven fabric can be used to form the entire air bag or a part of the air bag. Especially, the soft resin-applied woven fabric is preferably used to form a portion of the air bag which will come into contact with the human body when inflated, or aprons of the air bag which are required to exhibit a high heat resistance and an airproof property. When the soft resin layer is located on only one surface of the woven fabric, preferably the soft resin layer is located on an inside surface of the air bag which need to exhibit a high heat resistance.

In another embodiment of the air bag of the present invention, the air bag further comprises, in addition to the woven fabric (A), at least one woven fabric (C)

composed of warps and wefts each comprising at least heat resistant organic fibers (b) having a denier of 2 or less, a thermal decomposition temperature of 300° C. or more, and preferably a tensile strength of 16 g/d or more. This woven fabric (C) preferably has a cover factor of 700 or more, more preferably 700 to 3900, still more preferably 800 to 3500, and a fiber packing ratio of 0.3 to 0.6, more preferably 0.35 to 0.55.

Preferably, in this embodiment, the woven fabric (C) comprises 0 to 90% by weight of the thermoplastic synthetic fibers (a) and 10 to 100% by weight of the above-mentioned heat resistant organic fibers (b).

More preferably, the woven fabric (C) comprises 30 to 90% by weight, still more preferably 40 to 80% by weight of the thermoplastic synthetic fibers (a) and 10 to 70% by weight, still more preferably, 20 to 60% by weight of the heat resistant organic fibers.

Also, in this embodiment, the woven fabric (A) to be used together with the woven fabric (C) preferably has a cover factor of 1500 or more, more preferably 1900 to 3900, and a fiber-packing ratio of 0.5 to 0.9, more preferably 0.5 to 0.87.

Further, the heat resistant organic fibers (b) in the woven fabric (A) preferably have a tensile strength of 16 g/d or more, more preferably 18 g/d or more.

Furthermore, in this embodiment, the woven fabric (A) has a lower gas permeability than that of the woven fabric (C).

As mentioned above, the air bag of the present invention comprises a front circular portion and a back circular portion which are firmly sewn together at outside edge portions thereof.

When the air bag is inflated at a location between a steering wheel and a front seat of an automobile or aircraft, the front portion of the air bag faces a steering wheel and the back portion of the air bag faces the front seat.

In the above-mentioned embodiment of the air bag, the woven fabric (C) having a higher gas permeability than that of the woven fabric (A), preferably forms at least a portion of the front portion of the air bag facing the steering wheel and the woven fabric (A) having a low gas permeability forms the back portion of the air bag facing the front seat of the automobile or aircraft.

When the air bag is inflated in front of a driver on the front seat by a combustion gas, the back portion of the air bag formed from the woven fabric (A) can satisfactorily intercept any leakage of the combustion gas therethrough, while the front portion of the air bag formed from the woven fabric (C) allows an effective leak of a portion of the combustion gas from the air bag. This performance of the inflated air bag effectively protects a driver from damage due to the high temperature combustion gas. Also, this type of air bag does not need a vent hole, because a portion of the combustion gas can be leaked through the front portion of the air bag.

The seams in the air bag of the present invention preferably exhibit 60% or more of a retention of seam strength. This high retention can be attained by sewing the woven fabric into the form of a bag with sewing threads having a total denier of 600 to 1000 preferably 700 to 900, by a double chain stich method at a seam width of two sewing lines of 0.5 to 2 mm at a sewing 1 to 3 mm.

When the total denier is less than 600, the resultant sewing-threads exhibits an unsatisfactory methanical strength, and thus the resultant seams are sometimes broken by a breakage of the threads and exhibit a lowered retention of seam strength. When the total denier is more than 1000, the resultant seams have an undesirably large thickness, and thus the resultant air bag exhibits an unsatisfactory compactness.

The sewing threads preferably comprises at least one member selected from nylon 66 fiber yarns, polyester fiber yarns, meta-aramid fiber yarns and para-aramid fiber yarns. Particularly, the sewing threads consisting of para-aramid fiber yarns have a high heat resistance and mechanical strength, and thus are most preferable for the air bag of the present invention.

The double chain stitch sewing procedure for the air bag of the present invention is carried out at a seam width consisting of two sewing lines of 0.5 to 2 mm. In this double chain stitch sewing procedure, circular woven fabrics are sewn together by using two sewing needles to form two sewing lines parallel to each other.

The seam width refers to a distance between the center lines of the sewn threads. When the seam width is less than 0.5 mm, a sewing needle will possibly sew over the already sewn threads, and thus the sewing procedure cannot be smoothly carried out. When the seam width is more than 2 mm, the resultant seams sometimes exhibit an unsatisfactory retention of seam strength. The most preferable seam width is 0.8 to 1.2 mm.

The double chain stitch sewing procedure is preferably carried out at a sewing pitch of 1 to 3 mm. The sewing pitch refers to an interval between centers of the perforations formed by a sewing needle along a sewing line. When the sewing pitch is less than 1 mm, it is difficult to smoothly sew the woven fabric, and when the sewing pitch is more than 3 mm, the resultant seams exhibit an unsatisfactory retention of seam strength. The most preferable sewing pitch is 1.5 to 2.5 mm.

Figure 9:
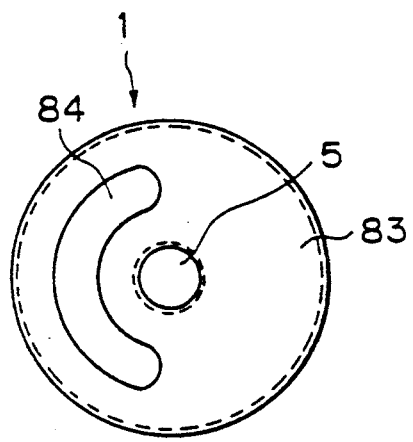
FIG. 9 is a plan view of still another embodiment of the air bag of the present invention.

Referring to FIG. 9, in a front portion 83 of an air bag 1 having a center hole 5, a cocoon-shaped portion 84 is formed by the woven fabric (C) and allows a leak of a combustion gas therethrough, and therefore, this type of air bag does not need a vent hole.

Figure 10:
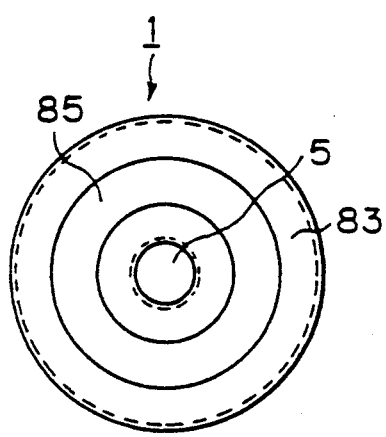
FIG. 10 is a plan view of still another embodiment of the air bag of the present invention.

Referring to FIG. 10, in a front portion 83 of an air bag 1 having a center hole 5, an annular portion 85 is formed by the woven fabric (C) and allows a leak of a combustion gas therethrough, and therefore, this type of air bag also has no vent hole.

The heat resistant organic fibers for the woven fabric (C) can be selected from the same fibers as those used for the woven fabric (A).

Also, the warps and wefts for the woven fabric (C) can be produced by the processes as mentioned above, and preferably consist of stretch-broken, fasciated fiber yarns.

In still another embodiment of the air bag of the present invention, the woven fabric (A) is composed of warps and wefts each consisting of the heat resistant organic fibers (b) having a denier of 2 or less, and a thermal decomposition temperature of 300° C. or more.

In this embodiment, the heat resistant organic fibers (b) preferably have a tensile strength of 16 g/d or more, more preferably 18 g/d or more, and the woven fabric (A) preferably has a cover factor of 2000 or more, more preferably 2000 to 3900, and a flame resistance of 5 seconds or more, more preferably 10 seconds or more.

In this embodiment, the heat resistant organic fibers (b) can be converted to a yarn by the processes as mentioned above; preferably to a stretch-broken, fasciated fiber yarn by using the apparatus as shown in FIG. 6.

Also, in this embodiment, the heat resistant organic fiber (b) can be selected from among those of the types as mentioned above.

The shock-absorbing air bag of the present invention is advantageous in that (1) the air bag is soft and flexible, and thus can be compactly folded, (2) the folded air bag has a satisfactorily small volume, and thus can be contained in a small space in an automobile or aircraft, (3) the air bag is light, (4) the air bag has a satisfactory resistance to a high temperature, high pressure combustion gas blast and flame, (5) the air bag has a low frictional resistance and a high mechanical strength, and can be smoothly inflated by the combustion gas blast without being broken, (6) the air bag can be easily produced by a sewing operation, (7) the air bag has a high resistance to a rupturing or tearing by metallic splinters or pieces of broken glass when an accident occurs, and (8) the air bag has a satisfactory storage durability and stability.

EXAMPLES

The present invention will be further illustrated by way of the following specific examples.

In the examples, the following tests were carried out.

(1) Inflation test

An air bag was connected to an inflater and a combustion gas blast was blown from the inflater into the air bag. Therefore, the conditions of the inflated air bag were observed by the naked eye.

(2) Flame resistance test

A flame having a temperature of about 780° C. was brought into contact with a lower surface of a woven fabric specimen fixed to and held horizontally by a frame, and a time needed to burn-perforate the specimen by the flame was measured.

(3) Basis weight of woven fabric

This was measured in accordance with Japanese Industrial Standard (JIS) L 1096.

(4) Thickness of woven fabric

This was measured in accordance with JIS L 1096.

(5) Tensile strength of woven fabric

This was measured in accordance with a strip method of JIS L 1096.

(6) Bursting strength of woven fabric

This was measured in accordance with a Müllen method of JIS L 1096.

(7) Gas permeability

This was measured by a Frazier method of JIS L 1096.

(8) Thickness of folded air bag

Figure 11:
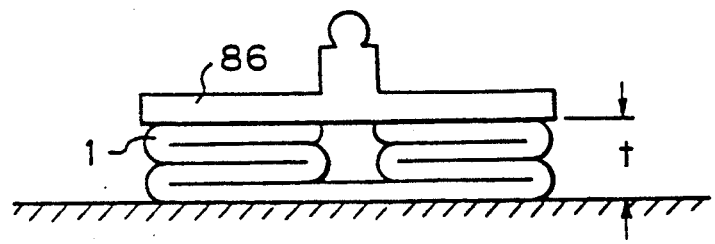
FIG. 11 shows a testing device for measuring a thickness of a folded air bag of the present invention, under a load.

The air bag was folded as indicated in FIGS. 2A, 2B and 2C. Referring to FIG. 11, a folded air bag 1 was pressed by a weight 86 under a load of 5 kg for 60 seconds, and the thickness t of the folded air bag 1 then measured.

This thickness t represents a compactness of the folded air bag.

(9) Touch and softness

A touch and softness of air bag surface were evaluated by an organoleptic test. These properties represent an intensity of a shock against a face of a driver when the air bag is rapidly inflated and comes into strong contact with the face of a driver.

EXAMPLE 1

A stretch-broken, fasciated fiber yarn was produced by using the fiber-stretch breaking fasciating apparatus as indicated in FIG. 4 from a polyethylene terephthalate (polyester) multifilament yarn having an individual filament denier of 2, an individual filament Young's modulus of 1200 kg/mm$^2$, a tensile strength of 8.5 g/d and a yarn count of 4000 deniers/2000 filaments, and a para-type wholly aromatic polyamide multifilament yarn available under the trademark of TECHNORA from TEIJIN LTD., having an individual filament denier of 0.75, a thermal decomposition temperature of 500° C., a tensile strength of 28 g/d and a yarn count 3000 denier/4000 filaments, and arranged in parallel to the polyester multi-filament yarn.

Referring to FIG. 4, a distance between the feed rollers 27 and the stretch-breaking rollers 29 was 100 m, and the parallel multifilaments 29 were stretch-broken between the above-mentioned rollers 27 and 29 at a stretch ratio of 16 and a peripheral speed of the rollers 29 of 200 m/min, while evenly blending the individual multifilaments with each other. The resultant stretch-broken, blended fiber bundle 30 was converted to a fasciated fiber yarn 33 by using a fasciating nozzle 32. The peripheral speed ratio of the stretch-breaking rollers 29 to the delivery rollers 34 was 100:97.

The resultant stretch-broken, fasciated fiber yarn, in which a number of short fibers were entwined around a fiber bundle core, had a denier of 450.

The resultant stretch-broken, fasciated fiber yarn contained the polyester fibers and the p-aramid fibers in a blending weight ratio of 57:43, and had an average length of the polyester fibers of 42 cm and an average length of the p-aramid fibers of 37 cm.

Also, the stretch-broken, fasciated fiber yarn was twisted at a twist number of 300 turns/m, and the resultant twisted yarn had a tensile strength of 8.2 g/d, an ultimate elongation of 4.5%, and a thermal shrinkage of 3.7% in boiling water.

A number of the twisted blended fiber yarns were converted to a woven fabric at a warp density of 54 yarns/25.4 mm and at a weft density of 50 yarns/25.4 mm, and the resultant woven fabric had a cover factor of 2206.

The woven fabric was calendered under a linear pressure of 500 kg/cm in a customary manner, and then converted to an air bag as shown in FIGS. 1A and 1B.

The properties of the air bag are shown in Table 1.

EXAMPLE 2

The same procedures as in Example 1 were carried out, with the following exceptions.

The stretch-broken, fasciated fiber yarn was produced from a very fine polyester multifilament yarn having an individual filament denier of 0.5 and a yarn count of 960 deniers/1920 filaments and a p-aramid (TECHNORA) multifilament yarn having an individual filament denier of 0.5, a tensile strength of 27 g/d and a yarn count of 2000 deniers/4000 filaments, arranged in parallel to each other.

The distance between the feed rollers and the stretch-breaking rollers was 75 cm, the stretch ratio was 11.5, the taking up speed of the stretch-breaking rollers was 300 m/min, the peripheral speed ratio of the stretch-breaking rollers to the delivery rollers was 100:97, and the resultant stretch-broken, fasciated fiber yarn had a total denier of 265.

In this yarn, the blending weight ratio of the polyester fibers to the p-aramid fibers was 32:68, the average length of the polyester fibers was 33 cm, and the average length of the p-aramid fibers was 28 cm.

When twisted at a twist number of 420 turns/m, the twisted blended fiber yarn had a tensile strength of 11.4 g/d and an ultimate elongation of 4.3%.

A number of the twisted yarns were converted to a plain woven fabric having a warp density of 69 yarns/25.4 mm, a weft density of 63 yarns/25.4 mm, and a cover factor of 2149.

The woven fabric was calendered in a customary manner, and then converted to an air bag as shown in FIGS. 1A and 1B.

The properties of the air bag are shown in Table 1.

EXAMPLE 3

A blended filament yarns was produced by using the filament-blending apparatus as indicated in FIG. 5, from a polyester multifilament yarn having an individual filament denier of 2.1, a tensile strength of 8.5 g/d and a yarn count of 300 deniers/143 filaments and a p-aramid (TECHNORA) multifilament yarn having an individual filament denier of 1, a tensile strength of 28 g/d and a yarn count of 100 deniers/100 filaments, arranged in parallel with each other under a uniform tension.

The resultant blended filament yarn had a total denier of 400, a blending weight ratio of the polyester filaments to the p-aramid filaments of 75:25, a tensile strength of 8.3 g/d measured at a twist number of 350 turns/m, and a thermal shrinkage of 5% in boiling water.

A number of the blended filament yarns were twisted at a twist number of 250 turns/m and then converted to a plain woven fabric having a warp density of 58 yarns/25.4 mm, a weft density of 54 yarns/25.4 mm and a cover factor of 2240.

The woven fabric was calendered in a customary manner, and then converted to an air bag as indicated in FIGS. 1A and 1B.

The properties of the air bag are shown in Table 1.

EXAMPLE 4

Tow spun yarns were produced by using the two spinning apparatus as shown in FIG. 7, from a stretch-broken polyester fiber sliver prepared from a polyester filament bundle having an individual filament denier of 1.5 and a total denier of 90,000 by stretch-breaking at a total draft of 7.0, and having an average fiber length of 100 mm and a total denier of 13,000 and a stretch-broken p-aramid (TECHNORA) fiber sliver prepared from a p-aramid filament bundle having an individual filament denier of 1.5 and a total denier of 90,000 by stretch-breaking at a total draft of 7.0 and having an average fiber length of 89 mm, a total denier of 13,000 and a Young's modulus of 7100 kg/mm$^2$.

In the tow spinning apparatus, the polyester fiber sliver and the p-aramid fiber sliver were arranged in parallel with each other and successively subjected to a gilling step, a roving step, and a fine spinning step.

The resultant blended spun yarns had a blending weight ratio of the polyester fibers to the p-aramid fibers of 50:50 and a yarn count of 10.6 s (total denier: 500).

A number of the blended spun yarns were converted to a plain woven fabric having a warp density of 48 yarns/25.4 mm, a weft density of 46 yarns/25.4 mm, a cover factor of 2102, a basis weight of 228 g/m$^2$.

The woven fabric was calendered in a customary manner, and then converted to an air bag as indicated in FIGS. 1A and 1B.

The resultant air bag had the properties as indicated in Table 1.

COMPARATIVE EXAMPLE 1

A plain woven fabric was produced from a number of warps and wefts each consisting of a nylon 66 multifilament yarn having an individual filament denier of 6.0 and a yarn count of 840 deniers/140 filaments.

This woven fabric had a warp and weft density of 25.4 yarns/25.4 mm, a thickness of 0.380 and a cover factor of 1449.

A surface of the woven fabric was coated with 100 g/m$^2$ of a chloroprene rubber and vulcanized at a temperature of 180° C. for 1.5 minutes by using a rollerhead, continuous vulcanizing machine available from AUMA CO, Germany, and the coated woven fabric was calendered. The resultant woven fabric had a thickness of 0.430 mm.

The coated woven fabric was converted to a woven fabric as shown in FIGS. 1A and 1B.

The air bag had the properties shown in Table 1.

COMPARATIVE EXAMPLE 2

A plain woven fabric having a warp density of 50 yarns/25.4 mm and a weft density of 49 yarns/25.4 mm was produced from a number of polyester multifilament yarns having an individual filament denier of 2.5, a tensile strength of 8.5 g/d, a yarn count of 500 denier/200 filaments and a twist number of 200 turns/m. The woven fabric had a cover factor of 2214.

The woven fabric was scoured and calendered in a customary manner, and then converted to an air bag as shown in FIGS. 1A and 1B.

The properties of the air bag are shown in Table 1.

TABLE 1

| Item | | Example No. | | | | Comparative Example | |
|------|---|---|---|---|---|---|---|
| | | Example | | | | | |
| | | 1 | 2 | 3 | 4 | 1 | 2 |
| Warp & weft | Material | Polyester fiber/ Technola fiber blend | Polyester fiber/ Technola fiber blend | Polyester fiber/ Technola fiber blend | Polyester fiber/ Technola fiber blend | Nylon 66 fiber | Polyester fiber |
| | Blending weight ratio | 57/43 | 32/68 | 75/25 | 50/50 | 100/0 | 100/0 |

TABLE 1-continued

| | | | Example No. | | | | | |
|---|---|---|---|---|---|---|---|---|
| | | | Example | | | | Comparative Example | |
| Item | | | 1 | 2 | 3 | 4 | 1 | 2 |
| | Total denier | | 450 | 265 | 400 | 500 | 840 | 500 |
| | Individual filament denier | Polyester fiber | 2.0 | 0.5 | 2.1 | 1.5 | Nylon 66 6.0 | 2.5 |
| | | Technola Fiber | 0.75 | 0.5 | 1.0 | 1.5 | — | — |
| | Type of yarn | | Stretch-broken, fasciated fiber yarn | Stretch-broken, fasciated fiber yarn | Blended filament yarn | Tow spun yarn | Multi-filament yarn | Multi-filament yarn |
| Woven fabric | Weaving density (yarn/25.4 mm) | Warp | 54 | 69 | 58 | 48 | 25.4 | 50 |
| | | Weft | 50 | 63 | 54 | 46 | 25.4 | 49 |
| | Cover factor | | 2206 | 2149 | 2240 | 2102 | 1524 | 2214 |
| | Basis weight (g/m$^2$) | | 220 | 165 | 215 | 228 | 309 | 240 |
| Woven fabric | Thickness (mm) | | 0.25 | 0.19 | 0.23 | 0.29 | 0.43 | 0.26 |
| | Elastomer-coated | | No | No | No | No | Chloroprene rubber-coated | No |
| Air bag | Inflation test | | Not burn-broken | Not burn-broken | Not burn-broken | Not burn-broken | Not burn-broken | Broken |
| | Flame resistance (sec) | | >60 | >60 | >60 | >60 | 6 | 1 |
| | Tensile strength (kg/25.4 mm) | | >200 | >200 | >200 | >200 | >200 | >200 |
| | Bursting strength (kg/cm$^2$) | | >45 | >45 | >45 | >45 | >45 | >45 |
| | Gas permeability (ml/cm$^2$/sec) | | 0.8 | 0.5 | 1.0 | 1.1 | 0.25 | 1.3 |
| | Compactness of folded air bag (mm) | | 31.2 | 22 | 24 | 35 | 54 | 28 |

EXAMPLE 5 TO 9 AND COMPARATIVE EXAMPLE 3 AND 4

In each of Examples 5 to 9 and Comparative Examples 3 and 4, the same procedures as in Example 1 were carried out except that the polyester multifilament yarns had an individual filament denier of 0.4, the p-aramid multifilament yarns had an individual filament denier of 1.5, the polyester yarns and the p-aramid yarns were blended at the blending weight ratio as indicated in Table 2, and the resultant blended fiber yarn had a total denier of 450.

The properties of the resultant air bag are shown in Table 2.

EXAMPLE 11

The same procedures as in Example 2 were carried out except that the woven fabric was calendered by a calender composed of a metal roller and an elastic roller at a metal roller surface temperature of 180° C. under a linear pressure of 250 kg/cm and a speed of 5 m/min.

The properties of the resultant woven fabric and air bag are shown in Table 3.

EXAMPLE 12

A p-aramid multifilament yarn (TECHNORA) having an individual filament denier of 0.75, a thermal decomposition temperature of 500° C., a tensile strength of

TABLE 2

| | Example No. | | | | | | |
|---|---|---|---|---|---|---|---|
| | Comparative Example | | Example | | | | |
| Item | 3 | 4 | 5 | 6 | 7 | 8 | 9 |
| Blending weight ratio Polyester fiber/Technola fiber | 100/0 | 95/5 | 90/10 | 80/20 | 60/40 | 40/60 | 30/70 |
| Air bag Inflation test | Broken | Broken | Not burn-broken | Not burn-broken | Not burn-broken | Not burn-broken | Not burn-broken |
| Flame resistance (sec) | 1 | 3 | 10 | >60 | >60 | >60 | >60 |
| Gas permeability (ml/cm$^2$/sec) | 0.4 | 0.4 | 0.6 | 0.7 | 0.9 | 1.0 | 1.3 |
| Compactness of folded air bag (mm) | 26 | 27 | 27 | 29 | 32 | 36 | 38 |
| Touch | Very soft | Very soft | Very soft | Very soft | Soft | Soft | Soft |

EXAMPLE 10

The same procedures as in Example 1 were carried out except that the woven fabric was calendered by a calender composed of a metal roller and a elastic roller at a metal roller surface temperature of 200° C. under a linear pressure of 400 kg/cm and a speed of 4 m/min.

The properties of the resultant woven fabric and air bag are shown in Table 3.

28 g/d and a yarn count of 3000 deniers/4000 filaments was converted to a stretch-broken fasciated fiber yarn having a total denier of 200 by using a fiber-stretch-breaking, fasciating apparatus as shown in FIG. 6.

In this apparatus, the distance between the feed rollers and the stretch-breaking rollers was 100 cm, and the p-aramid yarn was stretch-broken at a draft ratio of 15 at a speed of 200 m/min. The over feed applied to the stretch-broken fiber bundle between the stretch-breaking rollers and the delivery rollers was 0.5%.

The resultant stretch-broken, fasciated fiber yarn had an average length of the p-aramid fibers of 42 cm and a tensile strength of 23 g/d and an ultimate elongation of 3.7% measured after twisting at a twist number of 490 turns/m.

The fiber yarn was twisted at a twist number of 490 turns/m and converted to a plain woven fabric having a warp density of 60 yarns/25.4 mm, a weft density of 80 yarns/25.4 mm, and a cover factor of 2404.

The woven fabric was heat set at a temperature, scoured, and calendered in the same manner as in Example 10.

The woven fabric was converted to an air bag as shown in FIGS. 1A and 1B.

The properties of the woven fabric and air bag are shown in Table 3.

EXAMPLE 13

The same procedures as in Example 12 were carried out with the following exceptions.

The p-aramid multifilament yarn had an individual filament denier of 0.5, a thermal decomposition temperature of 500° C., a tensile strength of 28 g/d, and a yarn count of 4500 deniers/9000 filaments.

The distance between the feed rollers and the stretch-breaking rollers was 45 cm, the draft ratio was 15, the stretch-breaking roller speed was 300 m/min, and the over feed at the delivery rollers was 0.5%.

The resultant stretch-broken, fasciated fiber yarn had a total denier of 200, and an average length of the stretch broken fibers of 28 cm.

After twisting at a twist number of 400 turns/m, the fiber yarns had a tensile strength of 19 g/d and an ultimate elongation of 3.8%.

A number of the twisted yarns were converted to a plain woven fabric having a warp density of 79 yarns/25.4 mm, a weft density of 72 yarns/25.4 mm, and a cover factor of 2615.

The woven fabric was heat-set, scoured, and calendered in the same manner as in Example 10, and then converted to an air bag.

The properties of the woven fabric and air bag are indicated in Table 3.

EXAMPLE 14

The same procedures as in Example 3 were carried out by using the filament-blending apparatus as indicated in FIG. 5, with the following exceptions.

The p-aramid multifilament yarn had an individual filament denier of 0.75, a thermal decomposition temperature of 500° C., a tensile strength of 28 g/d, and a yarn count of 100 deniers/133 filaments.

The resultant blended filament yarn had a total denier of 400, a blending weight ratio of the polyester filaments to the p-aramid filaments of 75:25, and a tensile strength of 8.3 g/d determined at a twist number of 350 turns/m.

A number of the blended filament yarn were twisted at a twist number of 250 turns/m and converted to a plain woven fabric having a warp density of 58 yarns/25.4 mm, a weft density of 54 yarns/25.4 mm, and a cover factor of 2240.

The woven fabric was heat-set, scoured, and calendered in the same manner as in Example 10, and then converted to an air bag.

The properties of the woven fabric and air bag are shown in Table 3.

EXAMPLE 15

The same procedures as in Example 4 were carried out with the following exceptions.

The woven fabric was heat-set, scoured, and calendered in the same manner as in Example 10.

The properties of the resultant woven fabric and air bag are shown in Table 3.

COMPARATIVE EXAMPLE 5

The same procedures as in Comparative Example 1 were carried out except that the nylon 66 woven fabric had a cover factor of 1472 and a basis weight of 305 g/m$^2$, and the air bag had a gas permeability of 0.5 ml/cm$^2$/sec.

COMPARATIVE EXAMPLE 6

The same procedures as in Comparative Example 5 were carried out with the following exceptions.

The nylon 66 woven fabric was coated on a surface thereof with a silicone rubber in an amount of 100 g/m$^2$, and the coated silicone rubber layer was vulcanized at a temperature of 180° C. for one minute. The coated woven fabric had a thickness of 0.43 mm.

The properties of the resultant fabric and air bag are shown in Table 3.

COMPARATIVE EXAMPLE 7

The same procedures as in Comparative Example 2 were carried out with the following exceptions.

The woven fabric was calendered in the same manner as in Example 10 and had a gas permeability of 2.8 ml/cm$^2$/sec.

The properties of the woven fabric and air bag are shown in Table 3.

COMPARATIVE EXAMPLE 8

The same procedures as in Example 10 were carried out with the following exceptions.

The polyester multifilament yarn had an individual filament denier of 6, a tensile strength of 8.1 g/d, and a total denier of 4000.

The p-aramid multifilament yarn (TECHNORA) had an individual filament denier of 3, a tensile strength of 27 g/d, and a total denier of 3000.

The resultant stretch-broken, fasciated fiber yarn had a total denier of 450.

The blending weight ratio of the polyester fibers and the p-aramid fibers was 57:43.

The average length of the polyester fibers was 40 cm and the average length of the p-aramid fibers was 35 cm.

The resultant blended fiber yarn had a tensile strength of 8.0 g/d and an ultimate elongation of 4.8% measured at a twist number of 300 turns/m.

The blended fiber yarns were twisted at a twist number of 300 turns/m and converted to a plain woven fabric having a warp density of 54 yarns/25.4 mm, a weft density of 50 yarns/25.4 mm, and a cover factor of 2206.

The woven fabric was converted to an air bag.

The properties of the woven fabric and the air bag are shown in Table 3.

COMPARATIVE EXAMPLE 9

The same procedures as in Example 10 were carried out with the following exceptions.

The polyester multifilament yarn had an individual filament denier of 1, a tensile strength of 8.1 g/d, and a total denier of 6000.

The p-aramid multifilament yarn had an individual filament denier of 1.5, a tensile strength of 27 g/d, and a total denier of 500.

The draft ratio in the stretch-breaking step was 14.

The resultant blended fiber yarn had a total denier of 450, and a blending weight ratio of the polyester fibers to the p-aramid fibers of 92:8.

The average lengths of the polyester fibers and the p-aramid fibers were 46 cm and 34 cm, respectively.

The blended fiber yarn had a tensile strength of 5.6 g/d and an ultimate elongation of 10.8%, measured at a twist number of 300 turns/m.

The blended fiber yarns was twisted at a twist number of 300 turns/m and converted to a plain woven fabric having a warp density of 54 yarns/25.4 mm, a weft density of 50 yarns/25.4 mm, and a cover factor of 2206.

The properties of the resultant woven fabric and air bag are shown in Table 3.

TABLE 3

| Item | | | Example 10 | Example 11 | Example 12 | Example 13 | Example 14 | Example 15 | Example 5 | Example 6 | Comp. Ex. 7 | Comp. Ex. 8 | Comp. Ex. 9 |
|---|---|---|---|---|---|---|---|---|---|---|---|---|---|
| Warp & weft | Material | | Blend of Polyester fibers and p-aramid fibers | Blend of Polyester fibers and p-aramid fibers | p-aramid fibers | p-aramid fibers | Blend of polyester fibers and p-aramid fibers | Blend of polyester fibers and p-aramid fibers | Nylon 66 fibers | Nylon 66 fibers | Polyester fibers | Blend of polyester fibers and p-aramid fibers | Blend of polyester fibers and p-aramid fibers |
| | Individual fiber denier | Polyester fiber | 2 | 0.5 | — | — | 2.1 | 1.5 | — | — | Polyester 2.5 | 6 | 1 |
| | | p-aramid fiber | 0.75 | 0.5 | 0.75 | 0.5 | 1.5 | 1.5 | Nylon 66 6 | Nylon 66 6 | — | 3 | 1.5 |
| | Blending weight ratio | | 57/43 | 32/68 | 0/100 | 0/100 | 75/25 | 50/50 | 100/0 | 100/0 | 100/0 | 57/43 | 92/8 |
| | Tensile strength of p-aramid fiber (g/d) | | 28 | 27 | 28 | 28 | 28 | 28 | — | — | — | 27 | 27 |
| | Total denier | | 450 | 265 | 200 | 300 | 400 | 500 | 840 | 840 | 500 | 450 | 450 |
| Type of yarn | | | Stretch-broken, fasciated fiber yarn | Stretch-broken, fasciated fiber yarn | Stretch-broken, fasciated fiber yarn | | Blended filament yarn | Tow spun yarn | Multifilament yarn | Multifilament yarn | | Stretch-broken fasciated fiber yarn | |
| Woven fabric | Weaving yarn density (yarn/25.4 mm) | Warp | 54 | 69 | 90 | 79 | 58 | 48 | 25.4 | 25.4 | 50 | 54 | 54 |
| | | Weft | 50 | 63 | 80 | 72 | 54 | 46 | 25.4 | 25.4 | 49 | 50 | 50 |
| | Cover factor | | 2206 | 2149 | 2404 | 2615 | 2240 | 2102 | 1472 | 1472 | 2114 | 2206 | 2206 |
| | Fiber packing ratio | | 0.79 | 0.76 | 0.80 | 0.62 | 0.74 | 0.68 | 0.63 | 0.63 | 0.66 | 0.57 | 0.59 |
| Woven fabric | Basis weight (g/m²) | | 220 | 165 | 186 | 224 | 215 | 228 | 305 | 309 | 240 | 220 | 220 |
| | Thickness (mm) | | 0.27 | 0.17 | 0.18 | 0.26 | 0.21 | 0.24 | 0.43 | 0.43 | 0.26 | 0.28 | 0.27 |
| | Elastomer-coated | | No | No | No | No | No | No | Chloroprene coated | Silicone coated | No | No | No |
| Air bag | Inflation test | | Not burn-broken | Not burn-broken | Not burn-broken | Not burn-broken | Not burn-broken | Not burn-broken | Not burn-broken | Broken | Broken | Broken | Broken |
| | Flame resistance (sec) | | >60 | >60 | >60 | >60 | >60 | >60 | 6 | 4 | 1 | >60 | 10 |
| | Tensile strength (kg/3 cm) | | >200 | >200 | >200 | >200 | >200 | >200 | >200 | >200 | >200 | >200 | 139 |
| | Bursting strength (kg/cm²) | | >45 | >45 | >45 | >45 | >45 | >45 | >45 | >45 | >45 | >45 | 38 |
| | Gas permeability (ml/cm²/sec) | | 0.5 | 0.5 | 0.3 | 0.5 | 0.4 | 0.4 | 0.5 | 0.5 | 2.8 | 1.6 | 0.5 |
| | Compactness of folded air bag (mm) | | 29 | 22 | 23 | 30 | 31 | 28 | 54 | 53 | 28 | 20 | 22 |
| | Touch | | Soft | Soft | Soft | Soft | Soft | Soft | Stiff | Stiff | Stiff | Stiff | Soft |
| | General evaluation | | Satisfactory | Satisfactory | Satisfactory | Satisfactory | Satisfactory | Satisfactory | Unsatisfactory | Unsatisfactory | Unsatisfactory | Unsatisfactory | Unsatisfactory |

EXAMPLE 16

A woven fabric (A) for forming a main body of an air bag was produced by the same procedures as in Example 10, with the following exceptions.

The polyester multifilament yarn had an individual filament denier of 0.5, a tensile strength of 6 g/d, and a total denier of 4000.

The p-aramid multifilament yarn (TECHNOLA) had an individual filament denier of 0.75, a tensile strength of 28 g/d, and a total denier of 1000.

The resultant stretch-broken, fasciated fiber yarn (A1) had a total denier of 300, and a blending weight ratio of the polyester fibers to the p-aramid fibers of 80:20. In the yarn (A1), the polyester fibers and the p-aramid fibers had average lengths of 42 cm and 37 cm, respectively.

The yarn (A1) had a tensile strength of 8.2 g/d and an ultimate elongation of 4.5% measured after twisting at a twist number of 400 turns/m.

A number of the yarns (A1) twisted at a twist number of 400 turns/m were converted to a woven fabric (A) having a warp density of 67 yarns/25.4 mm, a weight density of 62 yarns/25.4 mm.

The woven fabric was calendered by the same calender as in Example 10.

The metal roller surface temperature of the calender was 200° C., and the calendering speed was 10 m/min.

A woven fabric (B) for forming aprons of the air bag was produced by the same procedures as mentioned above, with the following exceptions.

In the resultant blended fiber yarn (B1), the blending fiber ratio of the polyester fibers to the p-aramid fibers was 60:40.

The blended fiber yarn (B1) had a tensile strength of 9.2 g/d and an ultimate elongation of 4.1% measured after twisting at a twist number of 400 turns/m.

The woven fabric (A) was converted to a main body of an air bag as shown in FIG. 8.

In the air bag, portions surrounding a center hole and vent holes were reinforced by pieces of the woven fabrics (A) and (B) in such a manner that a piece of the woven fabric (B) was superimposed on the inside surface of the hole-surrounding portion of the air bag and then a piece of the woven fabric (A) was superimposed on the piece of the woven fabric (B), and the superimposed pieces of the woven fabrics (A) and (B) were sewn together onto the portion surrounding the hole in the air bag.

The properties of the woven fabrics (A) and (B) and the air bag are shown in Table 4.

EXAMPLE 17

The same procedures as in Example 16 were carried out with the following exceptions.

The blended fiber yarn (B1) had a blending weight ratio of the polyester fibers to the p-aramid fibers of 80:20, a tensile strength of 8.2 g/d, and an ultimate elongation of 4.5%.

The woven fabric (B) had a warp density of 70 yarns/25.4 mm and a weft density of 64 yarns/25.4 mm, after twisting at a twist number of 400 turns/m.

In the calendering step, the woven fabrics (A) and (B) were calendered at a metal roller surface temperature of 190° C. under a linear pressure of 400 kg/cm and a speed of 12 m/min.

The air bag was produced from the woven fabrics (A) and (B) in the same manner as in Example 16.

The test results are shown in Table 4.

EXAMPLE 18

The same procedures as in Example 16 were carried out with the following exceptions.

The yarn (B1) for the woven fabric (B) was produced from a p-aramid multifilament yarn alone having an individual filament denier of 0.5, a tensile strength of 28 g/d by using the fiber-stretch-breaking, fasciating apparatus as indicated in FIG. 6, and had a total denier of 300.

The p-aramid fiber yarn (B1) had a tensile strength of 22 g/d and an ultimate elongation of 3.8% measured after twisting at a twist number of 400 turns/m.

The woven fabric (B) had a warp density of 79 yarns/25.4 mm and a weft density of 72 yarns/25.4 mm.

The woven fabric (A), which is the same as in Example 16, and the woven fabric (B) were calendered in the same manner as in Example 17.

Each of the hole-surrounding portions of the air bag was reinforced by a piece of the woven fabric (B) attached to the inside surface of the hole-surrounding portion of the air bag.

The test results are shown in Table 4.

EXAMPLE 19

A blended filament yarn (A1) was produced by the same procedures as in Example 14 using a filament blending apparatus as shown in FIG. 5, except that the p-aramid multifilament yarn had an individual filament denier of 1.5, a tensile strength of 28 g/d, and total denier of 100.

The blending weight ratio of the polyester fibers to the p-aramid fibers in the blended filament yarn (A1) was 75:25.

The blended filament yarn (A1) had a tensile strength of 8.3 g/d and an ultimate elongation of 4.0% measured after twisting at a twist number of 350 turns/m.

The woven fabric (A) had a warp density of 58 yarns/25.4 mm and a weft density of 54 yarns/25.4 mm.

A tow spun yarn (B1) for the woven fabric (B) was produced by the same procedures as in Example 15 using the tow spinning apparatus as shown in FIG. 7.

A woven fabric (B) for aprons was prepared from a number of the tow spun yarn (B1) at a warp density of 48 yarns/25.4 mm and a weft density of 46 yarns/25.4 mm.

A air bag was produced from the woven fabrics (A) and (B). In the formation of aprons, a piece of the woven fabric (B) was superimposed on an inside surface of each hole-surrounding portion of the air bag and two pieces of the woven fabric (A) were superimposed on the piece of the woven fabric (B), and the superposed pieces of the woven fabrics (A) and (B) were sewn together onto the hole-surrounding portion of the air bag.

The test results are shown in Table 4.

TABLE 4

| | | Example | | | |
|---|---|---|---|---|---|
| Item | Example No. | 16 | | 17 | |
| Warp & | Distinction of yarn | A1 | B1 | A1 | B1 |

TABLE 4-continued

| | | | | | | |
|---|---|---|---|---|---|---|
| weft | Material | | Blend of polyester and p-aramid fibers | Blend of polyester and p-aramid fibers | Blend of polyester and p-aramid fibers | Blend of polyester |
| | Denier | | | | | |
| | Polyester filament | | 0.5 | 0.5 | 0.5 | 0.5 |
| | p-aramid filament | | 0.75 | 0.75 | 0.75 | 0.75 |
| | Blending weight ratio | | 80/20 | 60/40 | 80/20 | 80/20 |
| | Tensile strength (g/d) of p-aramide filament | | 28 | 28 | 28 | 28 |
| | Total denier | | 300 | 300 | 300 | 300 |
| | Type of yarn | | Stretch-broken, fasciated fiber yarn | Stretch-broken, fasciated fiber yarn | Stretch-broken, fasciated fiber yarn | Stretch-broken, fasciated fiber yarn |
| Woven fabric | Distinction of fabric | | A | B | A | B |
| | Weaving yarn density (yarn/25.4 mm) | Warp | 67 | 67 | 67 | 70 |
| | | Weft | 62 | 62 | 62 | 64 |
| | Cover factor | | 2234 | 2234 | 2234 | 2320 |
| | Fiber-packing ratio | | 0.72 | 0.72 | 0.72 | 0.75 |
| Woven fabric | Basis weight (g/m$^2$) | | 210 | 210 | 210 | 218 |
| | Thickness (mm) | | 0.21 | 0.21 | 0.21 | 0.21 |
| | Elastomer coating | | No | No | No | No |
| | Tensile strength (kg/3 cm) | | >170 | >170 | >170 | >170 |
| | Bursting strength (kg/cm$^2$) | | >45 | >45 | >45 | >45 |
| | Gas permeability (ml/cm$^2$/sec) | | 0.4 | 0.5 | 0.4 | 0.4 |
| | Flame resistance (sec) | | >60 | >60 | >60 | >60 |
| Air bag | Inflation test | | Not burn-broken | | Not burn-broken | |
| | Compactness of folded air bag (mm) | | 23 | | 25 | |
| | Touch | | Soft | | Soft | |
| | General evaluation | | Satisfactory | | Satisfactory | |

| | | Example | | | |
|---|---|---|---|---|---|
| Item | Example No. | 18 | | 19 | |
| Warp & weft | Distinction of yarn | A1 | B1 | A1 | B1 |
| | Material | Blend of polyester and p-aramid fibers | P-aramid fibers | Blend of polyester and p-aramid fibers | Blend of polyester and p-aramid fibers |
| | Denier | | | | |
| | Polyester filament | 0.5 | — | 2.1 | 1.5 |
| | p-aramid filament | 0.75 | 0.5 | 1.5 | 1.5 |
| | Blending weight ratio | 80/20 | 0.100 | 75/25 | 50/50 |
| | Tensile strength (g/d) of p-aramide filament | 28 | 28 | 28 | 28 |
| | Total denier | 300 | 300 | 400 | 500 |
| | Type of yarn | Stretch-broken, fasciated fiber yarn | Stretch-broken, fasciated fiber yarn | Blended filament yarn | Tow spun yarn |
| Woven fabric | Distinction of fabric | A | B | A | B |
| | Weaving yarn density (yarn/25.4 mm) Warp | 67 | 79 | 58 | 48 |
| | Weft | 62 | 72 | 54 | 46 |
| | Cover factor | 2234 | 2615 | 2240 | 2102 |
| | Fiber-packing ratio | 0.72 | 0.62 | 0.74 | 0.68 |
| Woven fabric | Basis weight (g/m$^2$) | 210 | 224 | 215 | 228 |
| | Thickness (mm) | 0.21 | 0.26 | 0.21 | 0.24 |
| | Elastomer coating | No | No | No | No |
| | Tensile strength (kg/3 cm) | >170 | >170 | >170 | >170 |
| | Bursting strength (kg/cm$^2$) | >45 | >45 | >45 | >45 |
| | Gas permeability (ml/cm$^2$/sec) | 0.4 | 0.4 | 0.4 | 0.4 |
| | Flame resistance (sec) | >60 | >60 | >60 | >60 |
| Air bag | Inflation test | Not burn-broken | | Not burn-broken | |
| | Compactness of folded air bag (mm) | 20 | | 31 | |
| | Touch | Soft | | Soft | |
| | General evaluation | Satisfactory | | Satisfactory | |

COMPARATIVE EXAMPLE 10

The same nylon 66 multifilament yarns as used in Comparative Example 1 were converted to a plain woven fabric having a warp and weft density of 25 yarns/25.4 mm and a thickness of 0.38 mm.

The woven fabric was coated with a chloroprene rubber in the same manner as in Comparative Example 1 to provide a coated woven fabric (A) for forming a main body of an air bag.

The same procedures as mentioned above were carried out, except that the chloroprene rubber was replaced by a silicone rubber and the vulcanizing procedure was carried out at a temperature of 180° C. for one minute, to provide a coated woven fabric (B) for forming aprons of the air bag.

The coated woven fabrics (A) and (B) both had a thickness of 0.43 mm.

The aprons were formed in the same manner as in Example 16, except that the inside surface of each hole-surrounding portion of the air bag was superimposed by a piece of the coated woven fabric (B) and then by two pieces of the coated woven fabric (A) superimposed on each other.

The test results are shown in Table 5.

COMPARATIVE EXAMPLE 11

The same procedures as in Comparative Example 10 were carried out with the following exceptions.

The nylon 66 multifilament yarn was replaced by a polyester multifilament yarn having an individual filament denier of 2.5, a tensile strength of 8.5 g/d and a total denier of 500.

In the preparation of the plain woven fabric, a number of the polyester multifilament yarn were twisted at a twisted number of 200 turns/m and woven at a warp density of 50 yarns/25.4 mm and at a weft density of 49 yarns/25.4 mm. The woven fabric was coated by the chloroprene rubber in the same manner as in Comparative Example 1 to provide a coated woven fabric (A) having a thickness of 0.26 mm.

In the preparation of a coated woven fabric (B), the same procedures as mentioned above were carried out except that the chloroprene rubber was replaced by a silicone rubber and the vulcanization was carried out at a temperature of 180° C. for 1.1 minutes. The coated woven fabric (B) had a thickness of 0.26 mm.

The coated woven fabrics (A) and (B) were converted to an air bag as shown in FIG. 8, in the same manner as in Comparative Example 10.

The test results are shown in Table 5.

COMPARATIVE EXAMPLE 12

In the preparation of the plain woven fabric (A), the same procedures as in Example 15 were carried out with the following exceptions.

The stretch-broken, fasciated fiber yarn (A1) was produced from a polyester multifilament yarn having an individual filament denier of 1, a tensile strength of 8.1 g/d and a total denier of 6000, and a p-aramid multifilament yarn (TECHNORA) having an individual filament denier of 1.5, a tensile strength of 27 g/d and a total denier of 500. The draft ratio in the stretch breaking step was 14. The resultant blended fiber yarn (A1) had a total denier of 450, and a blending weight ratio of the polyester filaments to the p-aramid filaments of 92:8.

In this yarn (A1), the polyester fibers and the p-aramid fibers had average lengths of 46 cm and 34 cm, respectively.

The yarn (A1) had a tensile strength of 5.6 g/d and an ultimate elongation of 10.8% measured after twisting at a twist number of 300 turns/m.

A number of the yarns (A1) were twisted at a twist number of 300 turns/m and woven at a warp density of 54 yarns/25.4 mm and at a weft density of 50 yarns/25.4 mm. The resultant woven fabric (A) was heat-set, scoured, and calendered in the same manner as in Example 16.

A stretch-broken, fasciated fiber yarns (B1) were produced in the same manner as in Example 16, except that the polyester multifilament yarn had an individual filament denier of 6, a tensile strength of 8.1 g/d and a total denier of 4000, and the p-aramid multifilament yarn had an individual filament denier of 3, a tensile strength of 28 g/d and a total denier of 3000.

The resultant blended fiber yarn (B1) had a total denier of 450, a blending weight ratio of the polyester fibers to the p-aramid fibers of 57:43, an average length of the polyester fibers of 40 cm, an average length of the p-aramid fibers of 35 cm, and a tensile strength of 8.0 g/d and an ultimate elongation of 4.8% measured after twisting at a twist number of 300 turns/m.

A number of the yarns (B1) were twisted at a twist number of 300 turns/m and converted to a plain woven fabric (B) having a warp density of 54 yarns/25.4 mm and a weft density of 50 yarns/25.4 mm.

The woven fabric (B) was heat-set, scoured, and calendered in the same manner as in Example 16.

The woven fabrics (A) and (B) were converted to an air bag with aprons formed on the air bag in the same manner as in Comparative Example 11.

The test results are shown in Table 5.

TABLE 5

| Item | Example No. | | Comparative Example 10 | | 11 | | 12 | |
|---|---|---|---|---|---|---|---|---|
| | | | | | | | | |
| Warp & weft | Distinction of yarn | | A1 | B1 | A1 | B1 | A1 | B1 |
| | Material | | Nylon 66 fibers | Nylon 66 fibers | Polyester fibers | Polyester fibers | Blend of polyester and p-aramid fibers | Blend of polyester and p-aramid fibers |
| | Denier | | | | | | | |
| | Polyester filament | | Nylon 66 6 | Nylon 66 6 | Polyester 2.5 | Polyester 2.5 | 1 | 6 |
| | p-aramid filament | | — | — | — | — | 1.5 | 3 |
| | Blending weight ratio | | 100/0 | 100/0 | 100/0 | 100/0 | 92/8 | 57/43 |
| | Tensile strength (g/d) of p-aramide filament | | — | — | — | — | 27 | 28 |
| | Total denier | | 840 | 840 | 500 | 500 | 450 | 450 |
| | Type of yarn | | Multifilament yarn | Multifilament yarn | Multifilament yarn | Multifilament yarn | Stretch-broken, fasciated fiber yarn | Stretch-broken, fasciated fiber yarn |
| Woven fabric | Distinction of fabric | | A | B | A | B | A | B |
| | Weaving yarn density (yarn/25.4 mm) | Warp | 25 | 25 | 50 | 50 | 54 | 54 |
| | | Weft | 25 | 25 | 49 | 49 | 50 | 50 |
| | Cover factor | | 1449 | 1449 | 2114 | 2114 | 2206 | 2206 |
| | Fiber-packing ratio | | 0.63 | 0.63 | 0.66 | 0.66 | 0.57 | 0.57 |
| Woven fabric | Basis weight (g/m$^2$) | | 309 | 309 | 240 | 240 | 220 | 220 |
| | Thickness (mm) | | 0.43 | 0.43 | 0.26 | 0.26 | 0.28 | 0.28 |
| | Elastomer coating | | Chloroprene rubber-coated | Silicone rubber-coated | Chloroprene rubber-coated | Silicone rubber-coated | 128 | >170 |
| | Tensile strength (kg/3 cm) | | >170 | >170 | >170 | >170 | 128 | >170 |

TABLE 5-continued

|  |  |  |  |  |  |  |  |
|---|---|---|---|---|---|---|---|
|  | Bursting strength (kg/cm²) | >45 | >45 | >45 | >45 | 31 | >45 |
|  | Gas permeability (ml/cm²/sec) | 0.5 | 0.5 | 0.5 | 0.5 | 0.5 | 1.6 |
|  | Flame resistance (sec) | 6 | 4 | 7 | 5 | 10 | >60 |
| Air bag | Inflation test | Not burn-broken | | Not burn-broken | | Broken | |
|  | Compactness of folded air bag (mm) | 54 | | 50 | | 22 | |
|  | Touch | Stiff | | Stiff | | Stiff | |
|  | General evaluation | Unsatisfactory | | Unsatisfactory | | Unsatisfactory | |

EXAMPLE 20

A plain woven fabric (A) for forming main portions of an air bag was prepared by the same procedures as in Example 10, with the following exceptions.

The stretch-broken, fasciated fiber yarns (blended fiber yarns) (A1) were produced from a polyester multifilament yarn having an individual filament denier of 1.3, a tensile strength of 7.2 g/d, and a total denier of 4,000, and a p-aramid multifilament yarn (TECHNORA) having an individual filament denier of 0.75, a tensile strength of 28 g/d and a total denier of 1000 by the same process as mentioned in Example 10, except that the peripheral speed of the stretch-breaking rollers was 300 m/min, and the resultant blended fiber yarn had a total denier of 300.

The resultant blended fiber yarns had a blending weight ratio of the polyester fibers to the p-aramid fibers of 80:20, an average length of the polyester fibers of 42 cm, an average length of the p-aramid fibers of 37 cm, and a tensile strength of 6.2 g/d and an ultimate elongation of 5.6% measured after twisting at a twist number of 400 turns/m.

The blended fiber yarns were twisted at a twist number of 250 turns/m and converted to a plain woven fabric having a warp density of 89 yarns/25.4 mm and a weft density of 68 yarns/25.4 mm.

The woven fabric was calendered by a calender composed of a metal roller and an elastic roller at a metal roller surface temperature of 180° C. under a linear pressure of 400 kg/cm and a speed of 10 m/min.

The resultant calendered woven fabric had a cover factor of 2719 and a fiber-packing ratio of 0.70.

A twill woven fabric (C), for forming a portion of an air bag through which a portion of a combustion gas can be discharged, was produced by the same procedures as mentioned above with the following exceptions.

The blending weight ratio of the polyester fibers to the p-aramid fibers was changed to 50:50. The resultant blended fiber yarns (C1) had an average length of the polyester fibers of 45 cm, an average length of the p-aramid fibers of 36 cm, and a tensile strength of 12.5 g/d and an ultimate elongation of 4.6%, measured after twisting at a twist number of 400 turns/m.

The blended fiber yarns (C1) were twisted at a twist number of 250 turns/m and converted to a 2/1 twill woven fabric having a warp and weft density of 40 yarns/25.4 mm.

The woven fabric was heat-set and scoured in the same manner as mentioned above.

The resultant twill woven fabric (C) had a cover factor of 1385 and a fiber-packing ratio of 0.47.

The plain woven fabric (A) and the twill woven fabric (C) were used to form an air bag as indicated in FIG. 9.

In this air bag, a combustion gas-permeable cocoon-shaped portion was formed from the twill woven fabric (C) in a front half portion of the air bag having a center hole through which the air bag is connected to an inflater. The other portion of the air bag was formed by the plain woven fabric (A).

This air bag had no vent hole.

The test results are shown in Table 6.

EXAMPLE 21

The same procedures as mentioned in Example 20 were carried out with the following exceptions.

The stretch-broken, fasciated fiber yarns (A1) for the plain woven fabric (A) were produced only from a p-aramid multifilament yarn having an individual filament denier of 0.75, a tensile strength of 28 g/d, and a total denier of 1000, in the same manner as in Example 20.

The resultant yarns (A1) had a total denier of 200, an average length of the p-aramid fibers of 40 cm, and a tensile strength of 22.3 g/d, and an ultimate elongation of 4.1% when twisted at a twist number of 490 turns/m.

The yarns (A1) were twisted at a twist number of 300 turns/m, and converted to a plain woven fabric (A) having a warp density of 112 yarns/25.4 mm and a weft density of 80 yarns/25.4 mm.

The woven fabric was calendered by a calender composed of a metal roller and an elastic roller at a metal roller surface temperature of 185° C. under a linear pressure of 440 kg/cm at a speed of 13 m/min.

The calendered woven fabric (A) had a cover factor of 2715 and a fiber-packing ratio of 0.71.

The stretch-broken, fasciated fiber yarns (C1) for the woven fabric (C) were produced only from a p-aramid multifilament yarn having an individual filament denier of 0.75, a tensile strength of 28 g/d and a total denier of 1000, by the same method as in Example 20.

The resultant yarns (C1) had a total denier of 100, an average length of the p-aramid fibers of 38 cm, and a tensile strength of 21.5 g/d and an ultimate elongation of 4.0% when twisted at a twist number of 690 turns/m.

The yarns (C1) were twisted at a twist number of 250 turns/m, and converted to a 2/1 twill woven fabric (C) having a warp density of 98 yarns/25.4 mm and a weft density of 98 yarns/25.4 mm.

The woven fabric (C) was heat-set and scoured in the same manner as mentioned above.

The resultant woven fabric (C) had a cover factor of 1960 and a fiber-packing ratio of 0.46.

The woven fabric (A) and (C) were employed to produce an air bag as shown in FIG. 10 having an annular portion located in a front half portion of the air bag and surrounding a center hole through which the air bag is connected to an inflater.

The annular portion was formed by the woven fabric (C) and the remaining portion of the air bag was formed by the woven fabric (A).

The resultant air bag did not have a vent hole.

An apron located around the center hole was formed by the woven fabric (A).

The test results are shown in Table 6.

EXAMPLE 22

The same procedures as described in Example 20 were carried out with the following exceptions.

The stretch-broken, fasciated fiber yarns (blended fiber yarn) (A1) for the woven fabric (A) were produced from a polyester multi-filament yarn having an individual filament denier of 1.3, a tensile strength of 7.2 g/d and a total denier of 3500, and a p-aramid multifilament yarn (TECHNORA) having an individual filament denier of 0.75, a tensile strength of 28 g/d and a total denier of 1500 in the same manner as in Example 20. The blending weight ratio of the polyester fibers to the p-aramid fibers was 70:30.

The resultant yarn (A1) had a total denier of 200, an average polyester fiber length of 42 cm, an average p-aramid fiber length of 37 cm, and a tensile strength of 8.2 g/d and an ultimate elongation of 4.3% when twisted at a twist number of 490 turns/m.

The yarns (A1) were twisted at a twist number of 250 turns/m and converted to a plain woven fabric (A) having a warp density of 113 yarns/25.4 mm and a weft density of 78 yarns/25.4 mm.

The woven fabric (A) was calendered by using a calender composed of a metal roller and an elastic roller at a metal roller surface temperature of 180° C. under a linear pressure of 400 kg/cm and a speed of 10 m/min.

The calendered woven fabric (A) had a cover factor of 2701 and a fiber-packing ratio of 0.68.

The stretch-broken, fasciated fiber yarns (C1) for the woven fabric (C) were produced from a polyester multifilament yarn having an individual filament denier of 1.3, a tensile strength of 7.2 g/d and a total denier of 1000, and a p-aramid multifilament yarn having an individual filament denier of 0.75, a tensile strength of 28 g/d and a total denier of 4000, in the same manner as in Example 20.

The blending weight ratio of the polyester fibers to the p-aramid fibers was 20:80.

The resultant yarns (C1) had a total denier of 200, an average polyester fiber length of 49 cm, an average p-aramid fiber length of 38 cm, and a tensile strength of 18.7 g/d and an ultimate elongation of 4.1% when twisted at a twist number of 690 turns/m.

The yarns (C1) were twisted at a twist number of 250 turns/m and then converted to a 2/1 twill woven fabric (C) having a warp density of 39 yarns/25.4 mm and a weft density of 35 yarns/25.4 mm.

The woven fabric (C) was heat-set and scoured in the above-mentioned manner.

The resultant woven fabric (C) had a cover factor of 1046 and a fiber-packing ratio of 0.35.

The woven fabrics (A) and (C) were used to provide an air bag composed of a front half portion having a center hole through which the air bag was connected to an inflater and a back half portion. The front half portion of the air bag was formed by the woven fabric (C). No vent hole was formed in the front half portion. The back half portion of the air bag was formed by the woven fabric (A). Also, an apron arranged around the center hole was formed by the woven fabric (A).

The test results are shown in Table 6.

Table 6 clearly shows that, in each of Examples 20 to 22, the air bag can be smoothly inflated into a good form under a satisfactory inflating pressure without burn-breaking, even though a vent hole was not formed in the air bag. Also, the air bag was easily folded to a satisfactory compactness.

TABLE 6

| Item | Example No. | | Example 20 | | Example 21 | | Example 22 | |
|---|---|---|---|---|---|---|---|---|
| Warp & weft | Distinction of yarn | | A1 | C1 | A1 | C1 | A1 | C1 |
| | Material | | Blend of polyester fibers and p-aramid fibers | Blend of polyester fibers and p-aramid fibers | p-aramide fibers | p-aramide fibers | Blend of polyester fibers and p-aramid fibers | Blend of fibers and p-aramid fibers |
| | Denier | | | | | | | |
| | Polyester filament | | 1.3 | 1.3 | — | — | 1.3 | 1.3 |
| | p-aramid filament | | 0.75 | 0.75 | 0.75 | 0.75 | 0.75 | 0.75 |
| | Blending weight ratio | | 80/20 | 50/50 | 0/100 | 0/100 | 70/30 | 20/80 |
| | Total denier | | 300 | 300 | 200 | 100 | 200 | 200 |
| | Type of yarn | | Stretch-broken, fasciated fiber yarn | Stretch-broken, fasciated fiber yarn | Stretch-broken, fasciated fiber yarn | Stretch-broken, fasciated fiber yarn | Stretch-broken, fasciated fiber yarn | Stretch-broken, fasciated fiber yarn |
| Woven fabric | Distinction of fabric | | A | C | A | C | A | C |
| | Weaving yarn density (yarn/25.4 mm) | Warp | 89 | 40 | 112 | 98 | 113 | 39 |
| | | Weft | 68 | 40 | 80 | 98 | 78 | 35 |
| | Cover factor | | 2719 | 1385 | 2715 | 1960 | 2701 | 1046 |
| | Fiber-packing ratio | | 0.70 | 0.47 | 0.71 | 0.46 | 0.68 | 0.35 |
| Woven fabric | Tensile strength (kg/3 cm) | | 170 | 173 | 496 | 182 | 160 | 137 |
| | Gas permeability (ml/cm$^2$/sec) | | 0.1≥ | 5.6 | 0.1≥ | 4.4 | 0.1≥ | 6.8 |
| Air bag | Inflation test | | Not burn-broken | | Not burn-broken | | Not burn-broken | |
| | Compactness of folded air bag (mm) | | 21 | | 14 | | 17 | |
| | Touch | | Soft | | Soft | | Soft | |

TABLE 6-continued

| General evaluation | Satisfactory | Satisfactory | Satisfactory |
| --- | --- | --- | --- |

COMPARATIVE EXAMPLE 13

A plain woven fabric having a warp and weft density of 25 yarns/25.4 mm was produced from nylon 66 multifilament yarns having an individual filament denier of 6, a tensile strength of 9.1 g/d, and a total denier of 840.

The woven fabric had a cover factor of 1450 and a fiber-packing ratio of 0.55.

A portion of the woven fabric was coated on a surface thereof with a solution of a chloroprene rubber in toluene to form a coating layer in an amount of 62% by weight.

The coated portion of the woven fabric was used as a woven fabric (A) and the non-coated portion of the woven fabric was used as a woven fabric (C).

An air bag was produced from the above-mentioned woven fabrics (A) and (C) in the same manner as in Example 20. The woven fabric (A) was also used to form aprons.

The test results are shown in Table 7.

Table 7 shows that, in the inflation test, the woven fabric C was melt-perforated and significantly broken. Also, it was difficult to compactly fold the air bag, and the folded air bag had a poor compactness.

COMPARATIVE EXAMPLE 14

The same procedures as in Example 21 were carried out with the following exception.

The same woven fabric (A) as that in Example 22 was used.

The stretch-broken, fasciated fiber yarns (C1) for the woven fabric (C) were produced from a polyester multifilament yarn having an individual filament denier of 1.3, a tensile strength of 7.2 g/d and a total denier of 4600, and a p-aramid multifilament yarn having an individual filament denier of 0.75, a tensile strength of 28 g/d and a total denier of 400.

The resultant yarn (C1) had a total denier of 200, a blending weight ratio of the polyester fibers to the p-aramid fibers of 92:8, an average polyester fiber length of 49 cm, an average p-aramid fiber length of 37 cm, and a tensile strength of 5.2 g/d and an ultimate elongation of 5.9% when twisted at a twist number of 490 turns/m.

The yarns (C1) were twisted at a twist number of 250 turns/m, and then converted to a plain woven fabric having a warp density of 25 yarns/25.4 mm and a weft density of 24 yarns/25.4 mm.

The woven fabric (C) was heat-set and scoured in a customary manner.

The resultant woven fabric (C) had a cover factor of 692 and a fiber-packing ratio of 0.39.

The woven fabrics (A) and (C) were used to provide an air bag in the same manner as in Example 21. No vent hole was formed in the air bag.

The test results are shown in Table 7.

Table 7 shows that, in the inflation test, several perforations were formed in the woven fabric (C) and the air bag was not sufficiently inflated. The compactness of the folded air bag was satisfactory.

COMPARATIVE EXAMPLE 15

The same procedures as in Example 22 were carried out with the following exceptions.

The same woven fabric as the woven fabric (A) in Example 22 and Comparative Example 14 was used as a woven fabric (C).

The same woven fabric as the woven fabric (C) in Comparative Example 14 was used as a woven fabric (A).

An air bag was produced from the above-mentioned woven fabrics (A) and (C) in the same manner as in Example 22. No vent hole was formed on the air bag.

The test results are shown in Table 7.

In the inflation test, large perforations were formed in the woven fabric (A) of the air bag, the air bag was sufficiently inflated, and the compactness of the folded air bag was satisfactory.

TABLE 7

| Item | Example No. | | Comparative Example 13 | | 14 | | 15 | |
| --- | --- | --- | --- | --- | --- | --- | --- | --- |
| Warp & weft | Distinction of yarn | | A1 | C1 | A1 | C1 | A1 | C1 |
| | Material | | Nylon 66 fibers | Nylon 66 fibers | Blend of polyester fibers and p-aramid fibers | C1 | A1 | C1 |
| | Denier | Polyester filament | — | — | 1.3 | 1.3 | 1.3 | 1.3 |
| | | p-aramid filament | Nylon 66 6 | Nylon 66 6 | 0.75 | 0.75 | 0.75 | 0.75 |
| | Blending weight ratio | | 0/100 | 0/100 | 70/30 | 92/8 | 70/30 | 80/20 |
| | Total denier | | 840 | 840 | 200 | 200 | 200 | 200 |
| | Type of yarn | | Multi-filament yarn | Multi-filament yarn | Stretch-broken, fasciated fiber yarn | Stretch-broken, fasciated fiber yarn | Stretch-broken, fasciated fiber yarn | Stretch-broken, fasciated fiber yarn |
| Woven fabric | Distinction of fabric | | A | C | A | C | A | C |
| | Weaving yarn density (yarn/25.4 mm) | Warp | 25 | 25 | 113 | 25 | 113 | 89 |
| | | Weft | 25 | 25 | 78 | 24 | 78 | 68 |
| | Cover factor | | 1450 | 1450 | 2701 | 692 | 2701 | 2719 |
| | Fiber-packing ratio | | 0.55 | 0.55 | 0.68 | 0.39 | 0.68 | 0.70 |
| | Tensile strength (kg/3 cm) | | 180 | 180 | 160 | 47 | 160 | 170 |
| | Gas permeability (ml/cm$^2$/sec) | | 6.1 | 6.1 | 0.1≧ | 8.5 | 0.1≧ | 0.1≧ |
| Air bag | Inflation test | | — | Broken | — | Broken | Broken | — |
| | Compactness of folded air bag (mm) | | 54 | | 18 | | 16 | |
| | Touch | | Stiff | | Soft | | Soft | |

TABLE 7-continued

| Item | Example No. | Comparative Example | | |
|---|---|---|---|---|
| | | 13 | 14 | 15 |
| | General evaluation | Unsatisfactory | Unsatisfactory | Unsatisfactory |

EXAMPLE 23

A stretch-broken, fasciated fiber yarns were produced from a p-aramid multifilament yarn (TECHNORA) having an individual filament denier of 0.75, a tensile strength of 28 g/d and a total denier of 3000 by using the apparatus as indicated in FIG. 6. In this step, the distance between the feed rollers and the stretch-breaking rollers was 100 cm, and the p-aramid yarn were stretch-broken at a draft ratio of 15 and a speed of 200 m/min. The over feed at the delivery rollers was 0.5%.

The resultant yarn had a total denier of 200, an average p-aramid fiber length of 42 cm and a tensile strength of 23 g/d, and an ultimate elongation of 3.7% when twisted at a twist number of 490 turns/m.

The yarn was twisted at a twist number of 490 turns/m and then converted to a plain woven fabric having a warp density of 90 yarns/25.4 mm, a weft density of 80 yarns/25.4 mm, and a cover factor of 2404.

The woven fabric was heat-set, scoured, and calendered in the same manner as in Example 10.

The woven fabric was converted to an air bag as indicated in FIGS. 1A and 1B.

The test results are shown in Table 8.

EXAMPLE 24

The same procedures as in Example 23 were carried out with the following exceptions.

The p-aramid multifilament yarn (TECHNORA) had an individual filament denier of 0.5, a tensile strength of 28 g/d, and a total denier of 4500.

The stretch-breaking step was carried out at a draft ratio of 15 and a speed of 300 m/min.

The resultant stretch-broken, fasciated yarn had a total denier of 300, an average p-aramid fiber length of 28 cm, and a tensile strength of 19 g/d and an ultimate elongation of 3.8% when twisted at a twist number of 400 turns/m.

The yarn was twisted at a twist number of 400 turns/m and converted to a plain woven fabric having a warp density of 79 yarns/25.4 mm, a waft density of 72 yarns/25.4 mm and a cover factor of 2615.

The test results are shown in Table 8.

EXAMPLE 25

A blended filament yarn was produced by using the filament-blending apparatus as shown in FIG. 5 from a p-aramid multifilament yarn (TECHNORA) having an individual filament denier of 1.5, a tensile strength of 28 g/d and a total denier of 200, and a p-aramid multifilament yarn available under the trademark of KEVLER 29, from Du Pont, and having an individual filament denier of 1.5, a tensile strength of 22 g/d and total denier of 200. The resultant blended filament yarn had a total denier of 400, and a tensile strength of 25 g/d when twisted at a twist number of 350 turns/m.

The blended filament yarn was twisted at a twist number of 300 turns/m and then converted to a plain woven fabric having a warp and weft density of 66 yarns/25.4 mm and a cover factor of 2540.

The woven fabric was heat-set, scoured, and calendered in the same manner as in Example 23.

The woven fabric was converted to an air bag as shown in FIGS. 1A and 1B.

The test results are shown in Table 8.

EXAMPLE 26

A p-aramid filament bundle (TECHNORA) having an individual filament denier of 1.5 and a total denier of 90,000 was stretch-broken at a total draft ratio of 7.

The resultant stretch-broken fiber sliver had an average fiber length of 89 mm, a total denier of 13,000 and a Young's modulus of 7100 kg/mm$^2$.

The sliver was converted to a tow spun yarn having a yarn count of 10.6 S and a total denier of 500, by using the tow spinning apparatus as shown in FIG. 7.

The p-aramid spun yarn was converted to a plain woven fabric having a warp density of 48 yarns/25.4 mm, a weft density of 46 yarns/25.4 mm, and a cover factor of 2102.

The woven fabric was heat-set, scoured, and calendered in the same manner as in Example 10, and converted to an air bag in the same manner as in Example 23.

The test results are shown in Table 8.

COMPARATIVE EXAMPLE 16

The same procedures as in Comparative Example 1 were carried out except that, before the coating step, the woven fabric had a cover factor of 1472 and a thickness of 0.38 mm and the coated woven fabric had a chloroprene rubber coating layer in an amount of 100 g/m$^2$ and a thickness of 0.43 mm.

The test results are shown in Table 8.

COMPARATIVE EXAMPLE 17

The same procedures as in Comparative Example 16 were carried out with the following exceptions.

The culvanizing step for the chloroprene rubber coating was carried out at a temperature of 180° C. for one minute.

The test results are shown in Table 8.

COMPARATIVE EXAMPLE 18

The same procedures as in Comparative Example 2 were carried out except that the resultant woven fabric had a gas permeability of 2.8 ml/cm$^2$/sec.

TABLE 8

| Item | Example No. | Example | | | | Comparative Example | | |
|---|---|---|---|---|---|---|---|---|
| | | 23 | 24 | 25 | 26 | 16 | 17 | 18 |
| Yarn | Material | TECHNORA | TECHNORA | Blend of TECHNORA AND KEVLER | TECHNORA | Nylon 66 | Nylon | Polyester |

TABLE 8-continued

| Item | Example No. | | Example | | | | Comparative Example | | |
|------|-------------|---|---------|---|---|---|---------------------|---|---|
| | | | 23 | 24 | 25 | 26 | 16 | 17 | 18 |
| | Individual filament denier | | 0.75 | 1.5 | 1.5/1.5 | 1.5 | 6 | 6 | 2.5 |
| | Total denier | | 200 | 300 | 400 | 500 | 840 | 840 | 500 |
| | Type of yarn | | Stretch-broken, fasciated fiber yarn | Stretch-broken, fasciated fiber yarn | Blended filament yarn | Tow spun yarn | Multi-filament yarn | Multi-filament yarn | Multi-filament yarn |
| Woven fabric | Weaving yarn density (yarn/25.4 mm) | Warp | 90 | 79 | 66 | 48 | 25.4 | 25.4 | 50 |
| | | Weft | 80 | 72 | 66 | 46 | 25.4 | 25.4 | 49 |
| | Cover factor | | 2404 | 2615 | 2640 | 2102 | 1472 | 1472 | 2114 |
| | Basis weight (g/m$^2$) | | 186 | 224 | 261 | 211 | 309 | 309 | 240 |
| | Thickness (mm) | | | | | | 0.43 | 0.43 | 0.26 |
| | Elastomer coating | | No | No | No | No | Chloroprene rubber-coated | Chloroprene rubber-coated | No |
| Air bag | Inflation test | | Not burn-broken | Not burn-broken | Not burn-broken | Not burn-broken | Not burn-broken | Broken | Broken |
| | Flame resistance (sec) | | >60 | >60 | >60 | >60 | 6 | 4 | 1 |
| | Tensile strength (kg/3 cm) | | >200 | >200 | >200 | >200 | >200 | >200 | >200 |
| | Bursting strength (kg/cm$^2$) | | >45 | >45 | >45 | >45 | >45 | >45 | >45 |
| | Gas permeability (ml/cm$^2$/sec) | | 0.8 | 0.5 | 1.5 | 1.8 | 0.5 | 0.5 | 2.8 |
| | Compactness of folded air bag (mm) | | 22 | 27 | 30 | 29 | 54 | 53 | 28 |

We claim:

1. A shock-absorbing air bag comprising at least one high density woven fabric (A) composed of warps and wefts each consisting of a stretch-broken fasciated fiber yarn which comprises:
   (a) 0 to 90% by weight of thermoplastic synthetic fibers having a denier of 5 or less and a Young's modulus of 1300 kg/mm$^2$ or less; and
   (b) 10 to 100% by weight of heat resistant organic fibers selected from the group consisting of wholly aromatic polyamide fibers, aramid-copolymer fibers, poly-p-phenylenesulfon fibers, poly-p-phenylenesulfide fibers, wholly aromatic polyester fibers, polyimide fibers, polyetheramide fibers and polyetheretherketone fibers, having a denier of 2 or less and a thermal decomposition temperature of 300° C. or more, and evenly blended with the thermoplastic synthetic fibers (a).

2. The air bag as claimed in claim 1, wherein the thermoplastic synthetic fibers (a) are blended with the heat resistant organic fibers in a blending weight ratio of 90:10 to 30:70.

3. The air bag as claimed in claim 1, wherein the thermoplastic synthetic fibers (a) are selected from polyester fibers, polyamide fibers, polyacrylic fibers, polyethylene fibers and polypropylene fibers.

4. The air bag as claimed in claim 1, wherein the heat resistant fibers (b) have a tensile strength of 16 g/denier or more.

5. The air bag as claimed in claim 1, wherein the wholly aromatic polyamide fibers and aramid-copolymer fibers are selected from poly-m-phenyleneisophthalamide fibers, poly-p-phenyleneterephthalamide fibers, para-type aramid-meta-type aramid-copolymer fibers and poly-p-phenyleneoxy-diphenyleneterephthalamide fibers.

6. The air bag as claimed in claim 1, wherein the woven fabric (A) has a cover factor of 1900 or more.

7. The air bag as claimed in claim 6, wherein the cover factor of the woven fabric (A) is from 1900 to 3900.

8. The air bag as claimed in claim 1, wherein the woven fabric (A) has a fiber-packing ratio of from 0.50 to 0.87.

9. The air bag as claimed in claim 1, wherein the woven fabric (A) has a flame resistance represented by a burn-perforating time of 5 seconds or more determined in such a manner that a flame at a temperature of about 780° C. is brought into contact with a lower surface of a specimen of the woven fabric (A) fixed to and held horizontally by a frame and a time needed to burn-perforate the specimen by the flame is measured.

10. The air bag as claimed in claim 1, wherein the stretch-broken, fasciated yarn is produced by arranging at least one thermoplastic synthetic multifilament yarn and at least one heat resistant multifilament yarn in parallel with each other; randomly stretch-breaking the resultant parallel filaments while preventing a disturbance of the filaments, and fasciating the resultant stretch-broken fibers with each other by blowing air jet streams thereon to form a fasciated fiber yarn.

11. The air bag as claimed in claim 1, which further comprises at least one reinforcing apron attached to at least one portion of the air bag surrounding at least one hole formed in the air bag and composed of a woven fabric (B) comprising at least the heat resistant fibers (b) in a higher content thereof than that in the woven fabric (A) and having a cover factor of 1900 or more and a fiber-packing ratio of 0.5 or more.

12. The air bag as claimed in claim 11, wherein the woven fabric (B) for the apron contains the heat resistant fibers (b) in a content of at least 5% by weight more than that in the woven fabric (A), and the apron is attached by sewing to an inside surface of the air bag.

13. The air bag as claimed in claim 11, wherein the woven fabric (B) is composed of warps and wefts each consisting of a stretch-broken, fasciated fiber yarn.

14. The air bag as claimed in claim 1, which further comprises, in addition to the woven fabric (A), at least one woven fabric (C) composed of warps and wefts each comprising at least heat resistant organic fibers with a denier of 2 or less, and a thermal decomposition temperature of 300° C. or more, said woven fabric (C) having a cover factor of 700 or more and a fiber packing ration or 0.3 to 0.6, said woven fabric (C) forming at least a portion of a front of the air bag which front portion faces, when the air bag is inflated at a location between a steering wheel and a front seat of an automobile or aircraft, the steering wheel and said woven fabric (A) forming a back portion of the air bag facing the front seat.

15. The air bag as claimed in claim 14 wherein the additional woven fabric (C) comprises 0 to 90% by weight of thermoplastic synthetic fibers (a) and 10 to 100% by weight of the heat resistant organic fibers (b).

16. The air bag as claimed in claim 14, wherein the woven fabric (A) to be used together with the woven fabric (C) has a cover factor of 1500 or more and a fiber-packing ratio of 0.6 to 0.9.

17. The air bag as claimed in claim 14, wherein the heat resistant organic fibers (b) in the woven fabric (A) has a tensile strength of 16 g/d or more.

18. The air bag as claimed in claim 14, wherein the woven fabric (A) has a gas permeability lower than that of the woven fabric (C).

19. The air bag as claimed in claim 14, wherein the warps and wefts of the woven fabric (C) are each a stretch-broken, fasciated fiber yarn.

20. The air bag as claimed in claim 14, wherein the heat resistant organic fibers in the woven fabric (C) have a tensile strength of 16 g/d or more.

* * * * *